(12) United States Patent
Cheema et al.

(10) Patent No.: US 12,266,159 B1
(45) Date of Patent: Apr. 1, 2025

(54) GENERATING DESCRIPTIONS OF ITEMS FROM IMAGES AND PROVIDING INTERFACE FOR SCALABLE REVIEW OF GENERATED DESCRIPTIONS

(71) Applicant: The RealReal, Inc., San Francisco, CA (US)

(72) Inventors: Hasan Cheema, San Francisco, CA (US); Christopher Brossman, Berkeley, CA (US); Matthew Charles Reed, Hawthorne, NV (US); Lucas Micol, Carmelo (UY); Gaston Rodriguez, Montevideo (UY); Agustin Azzinnari, Montevideo (UY); Viknesh Salivahanan, San Francisco, CA (US); Prasanth Bhaskaran, Brentwood, CA (US); Terry Lee, Alameda, CA (US); Andrew Richard Tompkins, Calgary (CA)

(73) Assignee: The RealReal, Inc., San Francisco, CA (US)

( * ) Notice: Subject to any disclaimer, the term of this patent is extended or adjusted under 35 U.S.C. 154(b) by 407 days.

(21) Appl. No.: 17/815,836

(22) Filed: Jul. 28, 2022

(51) Int. Cl.
G06V 10/778 (2022.01)
G06V 10/776 (2022.01)

(52) U.S. Cl.
CPC ........ *G06V 10/776* (2022.01); *G06V 10/7796* (2022.01)

(58) Field of Classification Search
CPC .. G06V 10/776; G06V 10/7796; G06N 20/00; G06N 3/08; G06F 18/20
See application file for complete search history.

(56) References Cited

U.S. PATENT DOCUMENTS 10,109,051 B1 * 10/2018 Natesh ............... G06T 7/00
10,534,809 B2 1/2020 Wiesel
(Continued)

FOREIGN PATENT DOCUMENTS

| AU | 2020102036 A4 | 10/2020 | |
|---|---|---|---|
| CN | 112567361 A * | 3/2021 | ........... G06F 16/532 |
| WO | WO-2021101231 A1 * | 5/2021 | ............... G06K 9/20 |

OTHER PUBLICATIONS

Sridevi, M et al., Personalized Fashion Recommender System With Image Based Neural Networks, published in IOP Conference Series: Materials Science and Engineering 981(2): 022073, Dec. 1, 2020, Abstract, DOI: https://doi.org/10.1088/1757-899X/981/2/022073.
(Continued)

*Primary Examiner* — Aaron W Carter
(74) *Attorney, Agent, or Firm* — Adibi IP Group, PC; Amir V. Adibi; Andrew C. Palmer

(57) ABSTRACT

A product description generating system dynamically generates a description of an item based on one or more images. The product description generating system includes an attribute machine learning system that receives images of the item and determines at least one attribute value and corresponding prediction confidence value based on the image data. The user review interface provides an interface for reviewing attribute values generated by the attribute machine learning system. If the prediction confidence value is outside a threshold, then the attribute value is reviewed by a user via the user review interface. If, on the other hand, the prediction confidence value is within a threshold, then the attribute value is used to generate the description without user review. The user review interface groups items to be reviewed by taxon and facilitates user review of many items at scale.

4 Claims, 32 Drawing Sheets

(56) References Cited

U.S. PATENT DOCUMENTS

| | | | | |
|---|---|---|---|---|
| 10,706,450 | B1* | 7/2020 | Tavernier | G06Q 30/00 |
| 10,817,749 | B2 | 10/2020 | Biswas | |
| 10,846,327 | B2* | 11/2020 | Salokhe | G06F 16/583 |
| 10,942,967 | B1* | 3/2021 | Biessmann | G06F 16/583 |
| 10,984,378 | B1* | 4/2021 | Eckman | G06Q 10/08 |
| 11,100,560 | B2 | 8/2021 | Parker | |
| 2016/0203525 | A1* | 7/2016 | Hara | G06Q 30/02 |
| 2017/0178060 | A1* | 6/2017 | Schwartz | G06Q 10/08 |
| 2019/0080207 | A1* | 3/2019 | Chang | G06K 9/62 |
| 2019/0244271 | A1* | 8/2019 | Piramuthu | G06Q 30/06 |
| 2019/0318405 | A1* | 10/2019 | Hu | G06Q 30/06 |
| 2020/0143454 | A1* | 5/2020 | Ananthanarayana | G06Q 30/06 |
| 2020/0151807 | A1 | 5/2020 | Zhou | |
| 2020/0184278 | A1* | 6/2020 | Zadeh | G06K 9/62 |
| 2021/0177163 | A1* | 6/2021 | Cohn | A47F 9/04 |
| 2021/0182287 | A1 | 6/2021 | Agarwal | |

OTHER PUBLICATIONS

Chakraborty, S et al., Fashion Recommendation Systems, Models and Methods: a Review, published in Informatics 8(3): 49, May 26, 2021, Abstract; Table 2; pp. 9-10, Section 5.2.1 and pp. 15-17, Section 5.3.1, DOI: https://doi.org/10.3390/informatics8030049.

Schindler, A et al., Fashion and Apparel Classification Using Convolutional Neural Networks, published in arXiv 2018: 1811.04374, Nov. 11, 2018, Abstract and p. 2, Section III and p. 3, Section V. B.

Shajini, M et al., An Improved Landmark-driven and Spatial-channel Attentive Convolutional Neural Network for Fashion Clothes Classification, published in the Visual Computer 37(6): 1517-1526, Jun. 29, 2020, DOI: https://doi.org/10.1007/s00371-020-01885-7.

* cited by examiner

EXAMPLE OF PRODUCT DETAIL PAGE

PRODUCT IMAGING SYSTEM

PRODUCT DESCRIPTION GENERATING SYSTEM

MACHINE LEARNING SYSTEM

EXAMPLE OF ML GENERATED ATTRIBUTE VALUES
AND PREDICTION CONFIDENCE VALUES

EXAMPLE OF ML GENERATED ATTRIBUTE VALUES
SUBJECT TO USER REVIEW
(BEFORE REVIEW)

EXAMPLE OF ML GENERATED PRODUCT ATTRIBUTE VALUES SUBJECT TO USER REVIEW
(AFTER REVIEW)

FIFTH MULTI-HEADED ML MODEL
(JEANS TAXON)

SIXTH MULTI-HEADED ML MODEL (DRESS TAXON)

OPERATION OF ONE EXAMPLE OF ONE HEAD OF ONE
MULTI-HEADED MACHINE LEARNING MODEL

| IMAGE | ATTRIBUTES AND ATTRIBUTE VALUES | |
|---|---|---|
|  | DRESS TYPE | A-LINE |
| | COLOR | WHITE |
| | PRINT | FLORAL |
| | SLEEVE | SLEEVELESS |
| | NECKLINE | SCOOP |
| | CLOSURE TYPE | CONCEALED ZIP |
| | CLOSURE LOCATION | SIDE |
|  | DRESS TYPE | ... |
| | COLOR | ... |
| | PRINT | ... |
| | SLEEVE | ... |
| | NECKLINE | ... |
| | CLOSURE TYPE | ... |
| | CLOSURE LOCATION | ... |

GENERATING DESCRIPTIONS OF ITEMS FROM IMAGES AND PROVIDING INTERFACE FOR SCALABLE REVIEW OF GENERATED DESCRIPTIONS

TECHNICAL FIELD

The present invention relates generally to generating descriptions of item images.

BACKGROUND INFORMATION

Many ecommerce sites provide online marketplaces for selling goods. Goods are often presented to potential buyers via a Product Detail Page (PDP). The PDP includes information about the item, including images of the item, make and brand, price, a purchase button, and a description of the goods. Purchasers often rely on these descriptions when deciding whether to purchase an item.

SUMMARY

A product description generating system includes an attribute machine learning system and an attribute quality control (QC) tool. The product description generating system dynamically generates a description of an item based on one or more images of the item. The product description generating system provides one or more user review interfaces for reviewing descriptive attributes generated by the attribute machine learning system. The user review interface provides a novel graphical user interface that allows for review of generated descriptions for many items at scale.

The attribute machine learning system that receives images of the item and determines at least one attribute value and corresponding prediction confidence value based on the one or more images. The attribute value describes a feature for the item that describes the item. The attribute values are reviewed by a user via a user review interface depending on the prediction confidence value. Attribute values generated by the product description generating system, including those that bypass user review or are updated based on user review, are used to dynamically generate descriptions for items. The product description generating system provides significant technical advancements in scalably and accurately generating descriptions for items on their respective sales pages, such as product detail pages, without dedicating significant human resources in reviewing and drafting item descriptions.

The product description generating system generates a corresponding prediction confidence value for each attribute value. The prediction confidence value indicates the attribute machine learning system's confidence in the predicted attribute value. If the prediction confidence value is outside of a threshold, then the attribute value and corresponding image are sent to the user review interface for user review. If, on the other hand, the prediction confidence value is within a threshold, then the attribute value is used in generating the description of the item without user review. The user review interface includes a UI panel that presents images of items all sharing the same attribute value predicted by the attribute machine learning system. This is a significant technical advancement as individuals responsible for quality control are able to efficiently review images of many items all having the same attribute value in a single UI element and flag any misclassified items.

In one embodiment, the attribute machine learning system comprises a network of multi-headed machine learning models, a training interface, and a router. Each of the multi-headed machine learning models is trained to determine attribute values and corresponding prediction confidence values for a particular type or taxon of items. In operation, the router routes one or more images for an item needing a description to the appropriate multi-headed machine learning model based on image metadata. For example, image metadata includes a tag indicating a taxon (e.g. "DRESS") used by the router to route this image to the multi-headed machine learning model trained to detect attributes of this particular taxon.

Each of the multi-headed machine learning models has a feature extraction network backbone, one or more classification heads, one or more predicted attribute selectors, and one or more threshold detectors. Each of the one or more classification heads is coupled to receive an image embedding from the feature extraction network backbone. Each classification head generates attribute values and prediction confidence values from the image embedding and supplies the generated attribute values and prediction confidence values to the respective predicted attribute selectors. Each of the predicted attribute selectors selects the attribute value having the greatest prediction confidence value and outputs this attribute value and prediction confidence value to a respective threshold detector. If the threshold detectors determine that the received attribute value and prediction confidence value is outside the threshold value, then the threshold detectors provide the attribute value to the novel user review interface. Otherwise, if the threshold detectors determine that the received attribute value and prediction confidence value are not outside the threshold value, then the threshold detectors bypass user review and supply the attribute value to the title and description generator.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
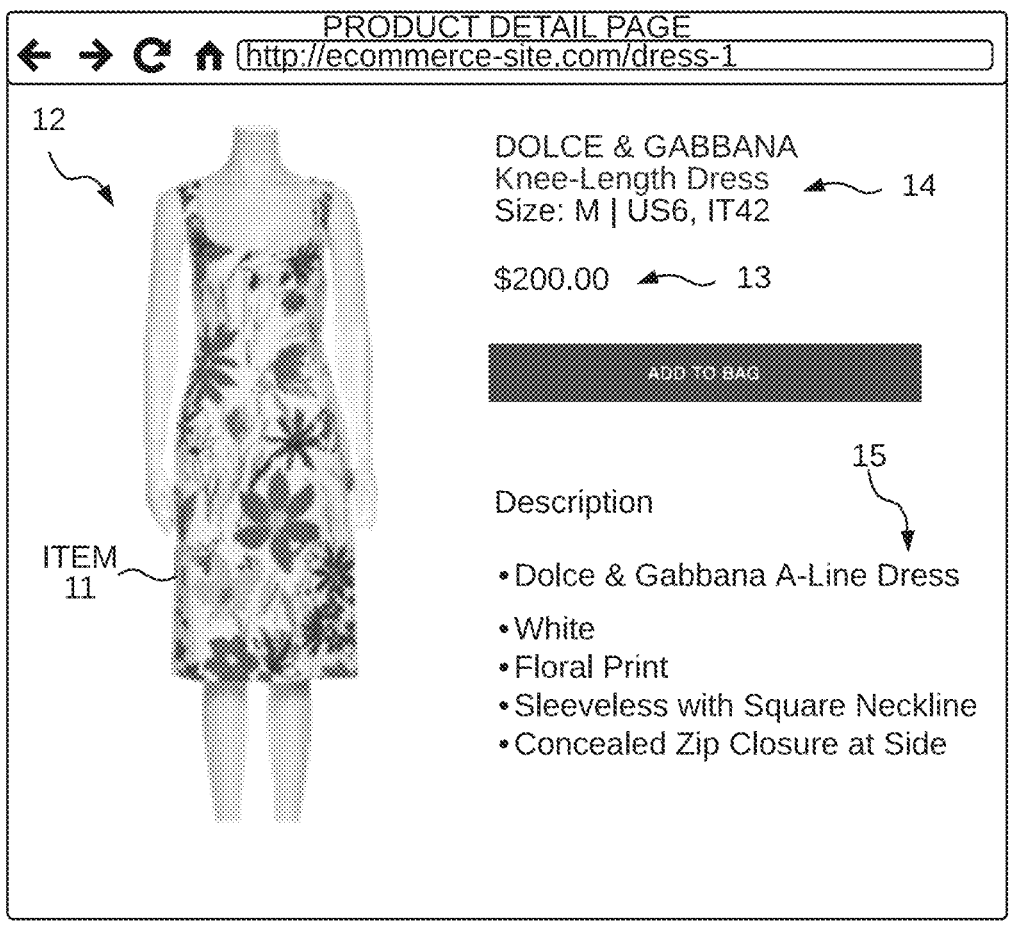
FIG. 1 is a diagram of a product detail page 10.

FIG. 1 is a diagram of a product detail page 10. The product detail page (PDP) 10 displays information about an item 11 available for purchase, such as an online ecommerce website. The PDP 10 is provided by a provider entity, such as a distributor, seller, reseller, Internet commerce entity, or any other marketplace entity that sells or distributes goods. The PDP 10 includes one or more images 12 of the item, price information 13, brand or designer information 14, and a description 15 of the item 11. The PDP 10 is displayed on a desktop or mobile web browser application or via a mobile application.

Figure 2A:
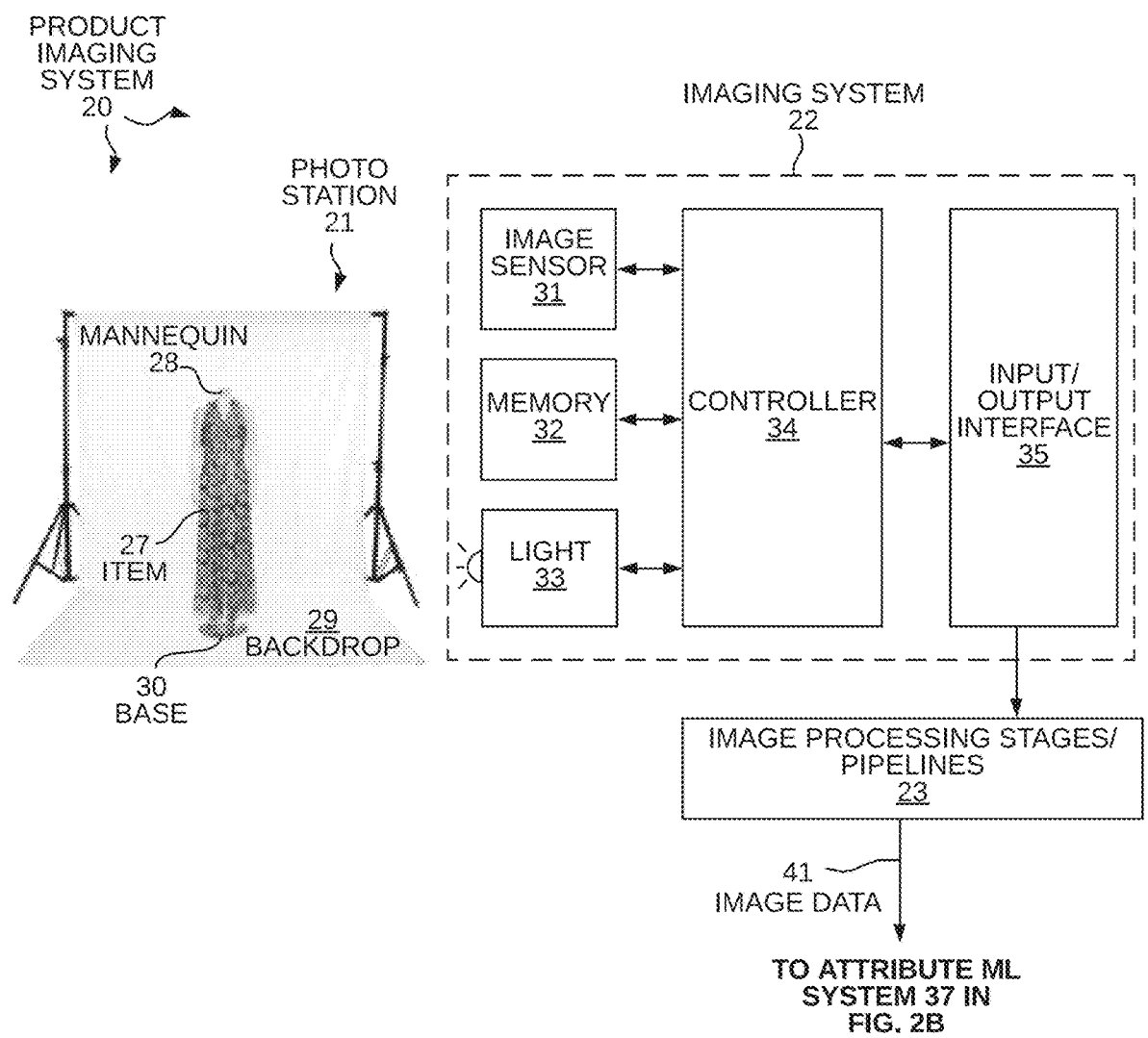
FIG. 2A is a diagram of a product imaging system 20 in accordance with one embodiment.

FIG. 2A is a diagram of a product imaging system 20 in accordance with one embodiment. The product imaging system 20 comprises a photography station 21, an imaging system 22, and image processing stages and pipelines 23. An item 27 is photographed in photo station 21, usually for the purpose of obtaining images that can be used to display the item 27 in a PDP, such as PDP 10, or other marketing and advertising materials. The item 27 is displayed on a mannequin 28 before a backdrop 29. The backdrop 29 is used to achieve desirable lighting conditions for photographing item 27. The mannequin 28 is supported by a base 30.

The imaging system 22 comprises an image sensor 31, a memory 32, a light 33, a controller 34, and an input/output interface 35. The imaging system 22 includes other hardware and software components not shown to simplify explanation. During photographing of item 27, the controller 34 controls image sensor 31 to capture images of item 27 and controls light 33 to provide desired lighting. Image data 41 is stored in memory 32. The controller 34 communicates the image data 41 to image processing stages and pipelines 23 via the input/output interface 38. The input/output interface 38 includes any suitable hardware for transferring the image data 41 via a wired or wireless connection to an external system.

The image processing stages and pipelines 23 comprises all stages necessary for an entity to prepare image data 41 for customer-facing usage. Image processing stages and pipelines 23 involves one or more of a combination of background removal, color correction, retouching, dropping shadows, image optimization, tagging, and other internal processes necessary to prepare images for commercial use. Image processing stages and pipelines 23 involves a combination of hardware and software. In some embodiments, the image processing stages and pipelines 23 also includes physical processes by which image data 41 is adapted to an organization's overall operations.

Figure 2B:
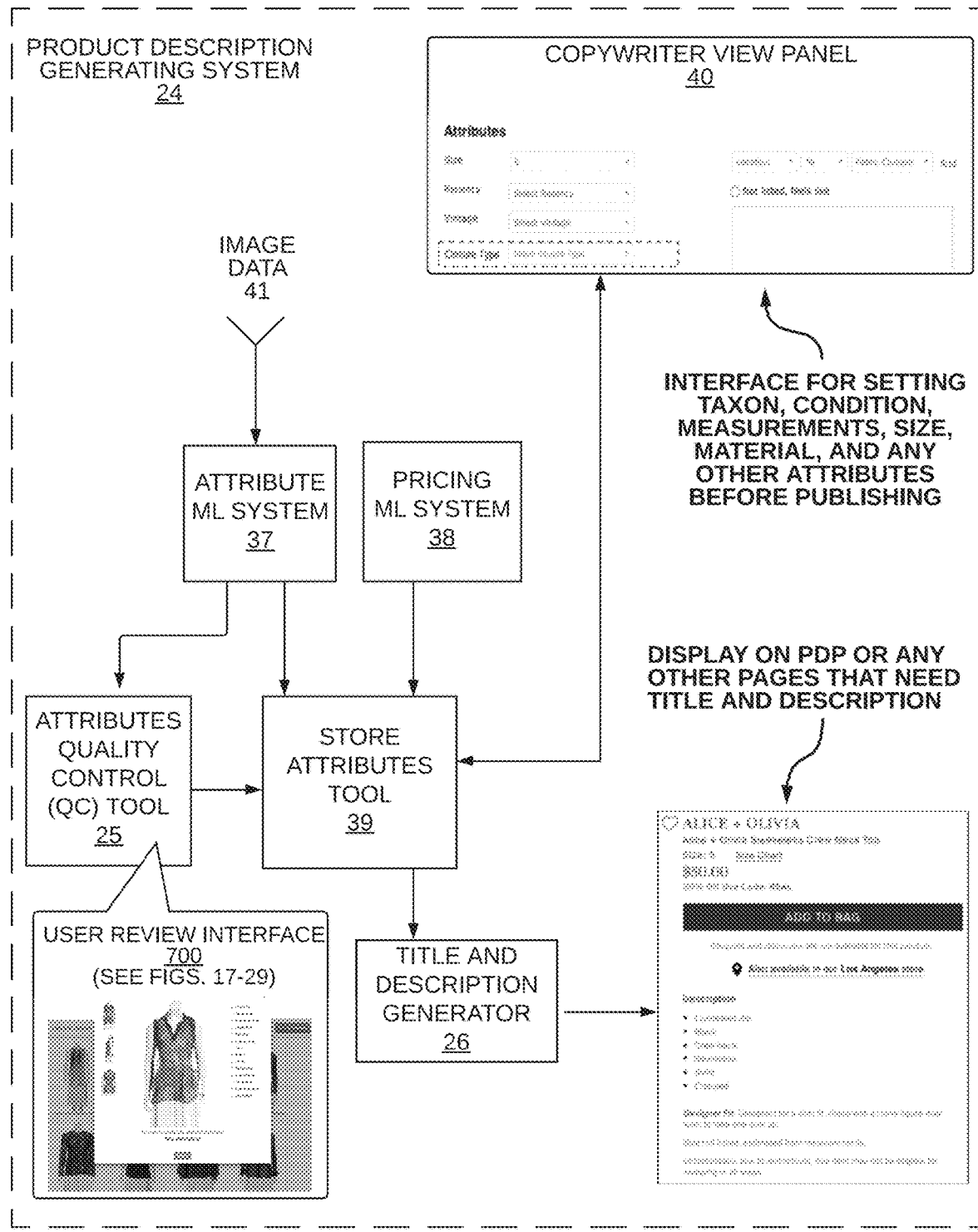
FIG. 2B is a diagram of a product description generating system 24 in accordance with one embodiment.

FIG. 2B is a detailed diagram of a product description generating system 24 in accordance with one embodiment. The product description generating system 24 comprises an attribute machine learning (ML) system 37, a pricing machine learning (ML) system 38, an attributes quality control (QC) tool 25, a store attributes tool 39 that presents a copywriter view panel 40, and a title and description generator 26 that provides data to PDPs. In one embodiment, various components of the description generating system 24 are realized as cloud computing resources, such as Google® Cloud Platform (GCP), Amazon® Web Services (AWS), or Microsoft® Azure, that operate over a distributed network. In various implementations, parts of the product description generating system 24 are also referred to as a "service" indicating the cloud-based nature of these various systems.

The product description generating system 24 receives the image data 41 from the image processing stages and pipelines 23. The attribute machine learning system 37 is used to dynamically generate a description of the item 27 based on image data 41. In one embodiment, the attribute machine learning system 37 uses the image data 41 to determine at least one attribute value and corresponding prediction confidence value based on the one or more images. The attribute value describes a feature for the item. The prediction confidence value indicates how confident the attribute machine learning system 37 is in associating the attribute value with the item.

The attribute QC tool 25 provides a user review interface 700 for reviewing attribute values generated by the attribute machine learning system 37. If the prediction confidence value generated by the attribute machine learning system 37 is outside of a threshold, then the attribute value is provided to the attribute QC tool 25. The attribute QC tool 25 provides a novel graphical user interface that allows an entity to review attribute values at scale. As explained in further detail below, the attribute QC tool 25 includes a UI panel that presents images of items all sharing the same attribute value predicted by the attribute machine learning system 37. This is a significant technical advancement as quality control personnel are able to quickly review and update many images of items all having the same attribute value.

The pricing machine learning system 38 is used to dynamically generate a description of item 27 based on market and pricing information. In one example, a description of item 27 is based on information received from the attribute machine learning system 37 and information received from the pricing machine learning system 38.

The copywriter view panel 40 provides a user with a novel graphical user interface for setting attributes before publishing. For example, the user is able to set taxon, condition, measurements, size, material, and other attributes of item 27. The copywriter view panel 40 allows a user to update information that was received from the attribute machine learning system 37 and pricing machine learning system 38. Additionally, the user may add information that was not provided by the attribute machine learning system 37 or the pricing machine learning system 38. For example, if the attribute ML system 37 is not configured to detect a particular attribute, then a user may input the appropriate attribute via the copywriter view panel 40. In one embodiment, user feedback provided via the copywriter view panel 40 is used to improve the attribute machine learning system 37 and pricing machine learning system 38.

In the title and description generator 26, a description of the item 27 is available and the item 27 is ready to proceed to the next stage in the entity's process flow. For example, once the description is generated, a PDP is generated for the item 27 and made accessible on the entity's sales page. If the prediction confidence value generated by the attribute machine learning system 37 is within a threshold, then the attribute value advances to the store attributes tool 39 and on to the title and description generator 26 without user review.

Figure 3:
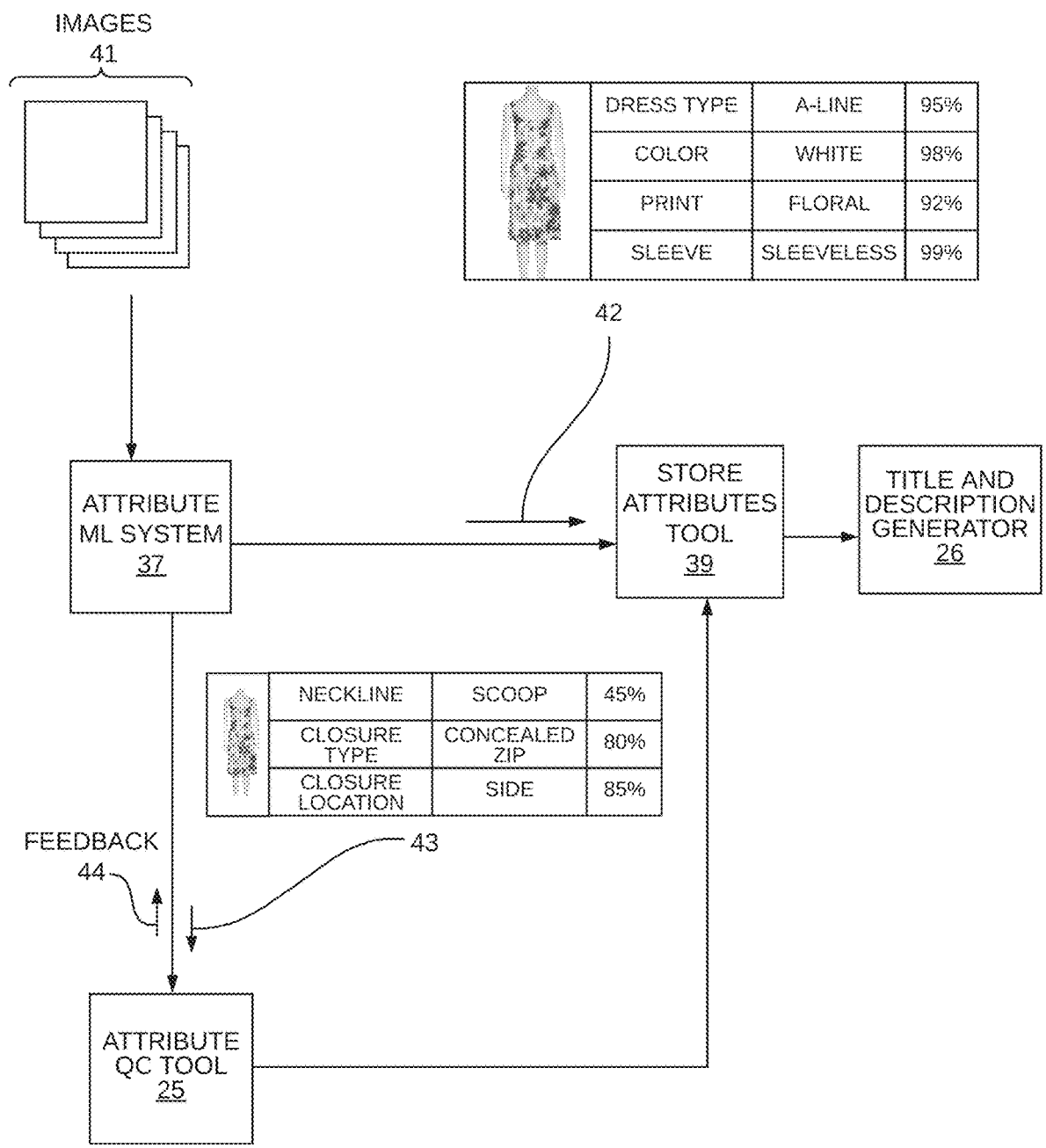
FIG. 3 is a diagram showing how the attribute machine learning system 37 forwards some attribute values directly to the title and description generator 26 without user review and forwards other attribute values to the attribute QC tool 25.

FIG. 3 is a diagram showing how the attribute machine learning system 37 forwards some attribute values to the store attributes tool 39 without user review and forwards other attribute values to the attribute QC tool 25 for user review. Reference numeral 42 identifies a group of attribute values generated by the attribute machine learning system 37 that enter the store attributes tool 39. The attribute machine learning system 37 has sufficient confidence that attribute values 42 are correctly associated with images 41. As such, attribute values 42 skip user review and are sent directly to the store attributes tool 39. In some applications, this means that the attribute values 42 predicted by the attribute machine learning system 37 are effectively ready to be forwarded for customer-facing exposure in marketing or advertising material, such as a PDP 10.

Reference numeral 43 identifies a group of attribute values generated by the attribute machine learning system 37 that are forwarded to the attribute QC tool 25 for user review. The attribute machine learning system 37 assigned a confidence value to each of attribute values 43 outside a threshold indicating that the attribute values 43 need further review by a user. As such, attribute values 43 are reviewed by a user via attribute QC tool 25 prior to being sent to the store attributes tool 39.

In accordance with one novel aspect, the attribute QC tool 25 provides a novel interface for one or more users to review many product images simultaneously all having a common attribute value. The attribute QC tool 25 provides a graphical user interface that allows a user to quickly scroll through and visually identify images of products that are suspect and possibly incorrectly classified by the attribute machine learning system 37. The attribute QC tool 25 presents alternative attribute values that are selectable via the attribute QC tool 25 in less than two clicks. For example, a user selects a radio button identifying the correct attribute value and then clicks a "SUBMIT" button to associate the correct attribute value with the item. In one embodiment, the attribute QC tool 25 provides feedback information 44 used by the attribute machine learning system 37 to update internal weights and improve accuracy over an operating time period.

The attribute QC tool 25 is a technical advancement that allows an entity, such as an online consignment entity, seller, distributor, reseller, or auctioneer to generate product descriptions for many items in a scalable and commercially feasible fashion. The product description generating system 24 in combination with the attribute QC tool 25 reduces the number of human reviewers required to ensure product descriptions are accurate for large-scale operations. The attribute QC tool 25 reduces the amount of time involved in checking attribute values generated by the attribute machine learning system 37. The attribute machine learning system 37 and attribute QC tool 25 achieve efficient product description generation involving minimal human input at a scale never achievable before.

Figure 4:
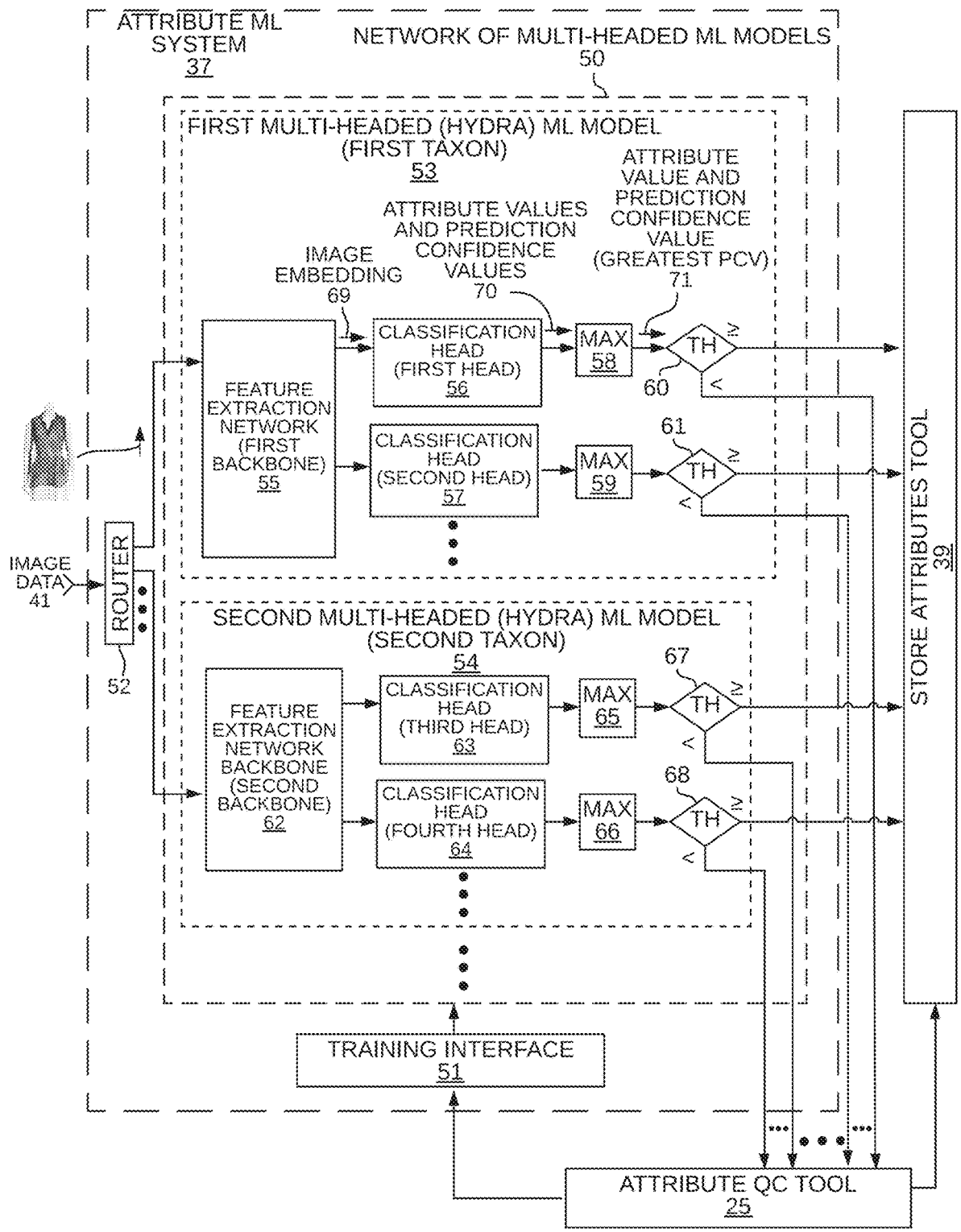
FIG. 4 is a detailed diagram of the attribute machine learning system 37 in accordance with one embodiment.

FIG. 4 is a detailed diagram of the attribute machine learning system 37 in accordance with one embodiment. The attribute machine learning system 37 comprises a network of multi-headed machine learning models 50, a training interface 51, and a router 52. Each of the multi-headed machine learning models 50 is trained to determine attribute values and corresponding prediction confidence values for a particular type or taxon of item. In the context of clothing items, these taxons include, but are not limited to tops, knitwear, jackets, coats, jeans, or dresses. Each of the multi-headed machine learning models 50 realizes a hydra machine learning architecture having a feature extraction network backbone and one or more classification heads. Each of the multi-headed machine learning models 50 is also referred to as a "hydra machine learning model", "hydra model", or as a "hydra". In the example of FIG. 4, network 50 is shown as having only two hydra models each having two classification heads. However, it is understood that the diagram of FIG. 4 is presented for explanatory purposes and that in implementation, network 50 may have more than two hydra models each hydra model having one, two, or more classification heads.

The network of multi-headed machine learning models 50 comprises a multi-headed machine learning model 53 and a multi-headed machine learning model 54. The multi-headed machine learning model 53 comprises a feature extraction network backbone 55, one or more classification heads 56 and 57, one or more predicted attribute selectors 58 and 59, and one or more threshold detectors 60 and 61. Each of the one or more classification heads 56 and 57 is coupled to receive an image embedding from the feature extraction network backbone 55. Each classification head 56 and 57 generates attribute values and prediction confidence values from the image embedding and supplies the generated attribute values and prediction confidence values to the respective predicted attribute selectors 58 and 59. Each of the predicted attribute selectors 58 and 59 selects the attribute value having the greatest prediction confidence value and outputs this attribute value and prediction confidence value to a respective threshold detector 60 and 61. If the threshold detectors 60 and 61 determine that the received attribute value and prediction confidence value is outside the threshold value, then the threshold detectors 60 and 61 provide the attribute value to attribute QC tool 25. Otherwise, if the threshold detectors 60 and 61 determine that the received attribute value and prediction confidence value are not outside the threshold value, then the threshold detectors 60 and 61 bypass user review and supply the attribute value to the store attributes tool 39.

The multi-headed machine learning model 54 comprises a feature extraction network backbone 62, one or more classification heads 63 and 64, one or more predicted attribute selectors 65 and 66, and one or more threshold detectors 67 and 68.

Figure 5:
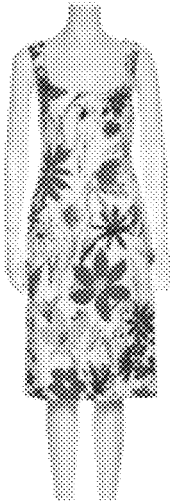
FIG. 5 is a diagram of a table showing the attribute values and corresponding prediction confidence values generated by the attribute machine learning system 37 in FIG. 4 for an image.

FIG. 5 is a diagram of a table showing attribute values and prediction confidence values generated by the attribute machine learning system 37 in FIG. 4 for an image. Each classification head is trained to identify a specific attribute for a particular taxon of items. Reference numeral 42 identifies a subset of the generated attribute values that will pass directly to the store attributes tool 39 without user review. Reference numeral 43 identifies a subset of the generated attribute values that will be passed to the attribute QC tool 25 for user review.

Figure 6:
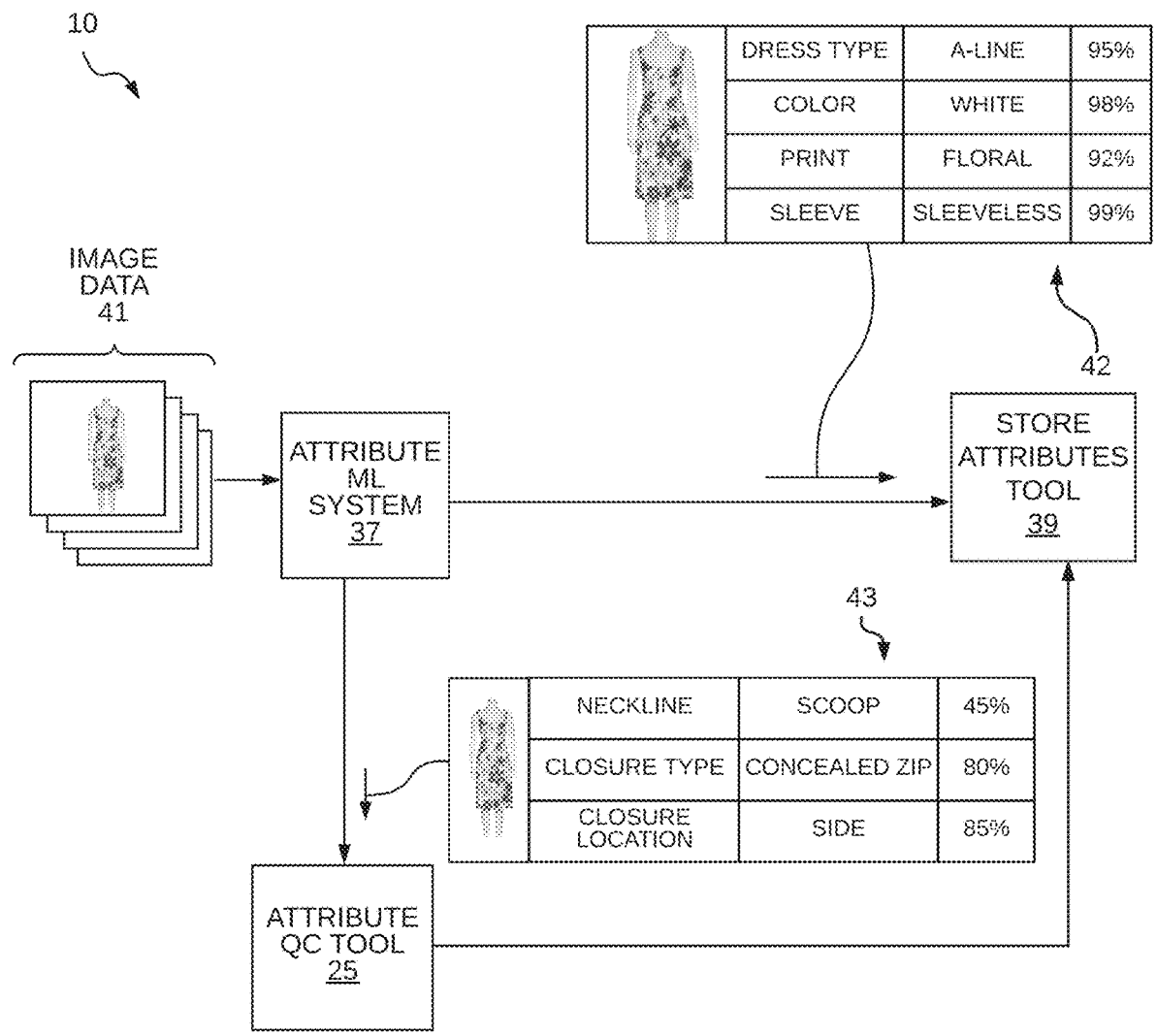
FIG. 6 is a diagram illustrating how the subset 42 of the generated attribute values are communicated to the store attributes tool 39 without user review and how the subset 43 of the generated attribute values undergo user review via the attribute QC tool 25.

FIG. 6 is a diagram illustrating how the subset 42 of the generated attribute values are communicated to the store attributes tool 39 without user review and how the subset 43 of the generated attribute values undergo user review via the attribute QC tool 25.

Figure 7:
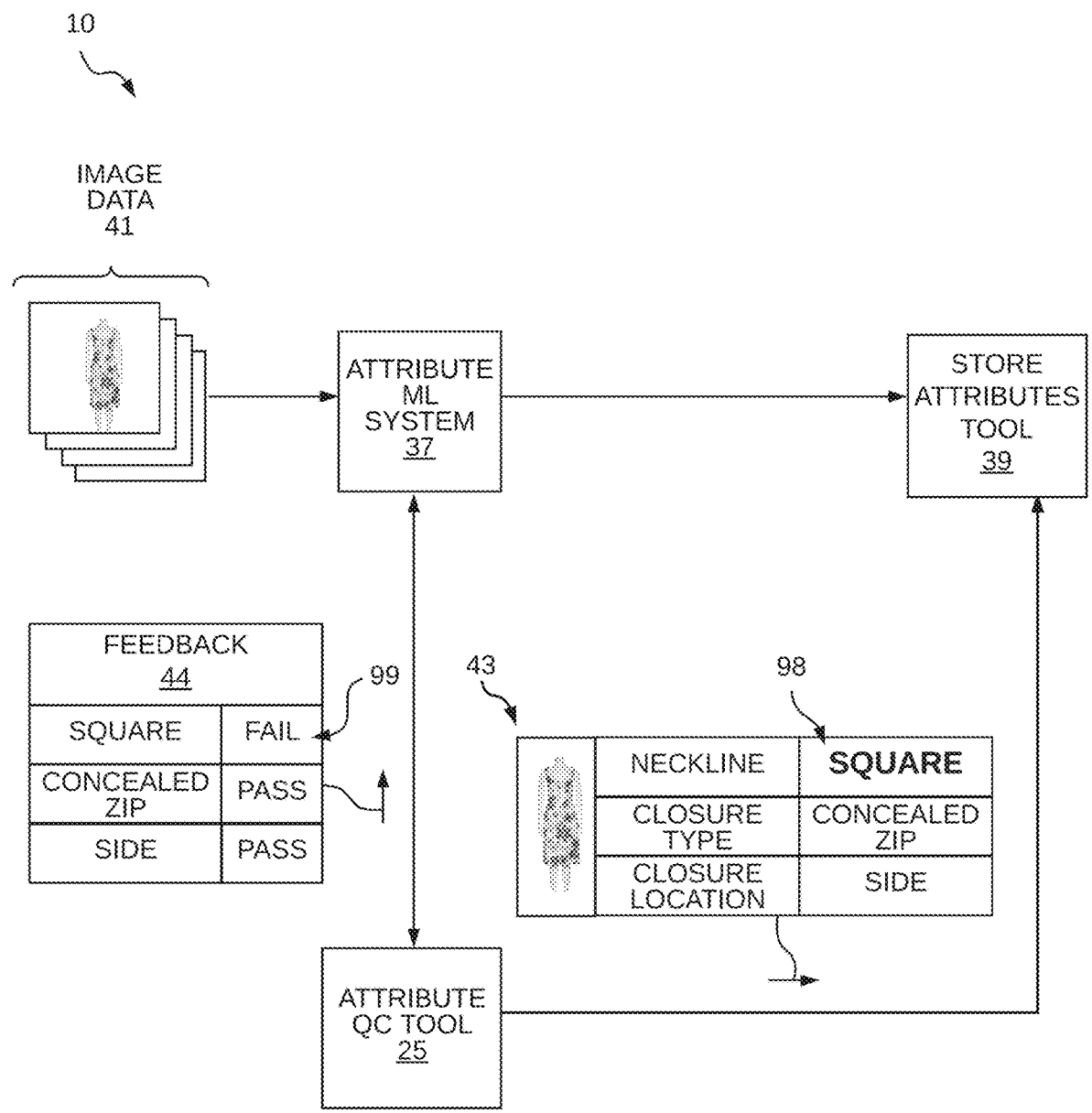
FIG. 7 is a diagram showing how the attribute QC tool 25 provides updated attribute values to the store attributes tool 39 and feedback information 44 to the attribute machine learning system 37.

FIG. 7 is a diagram showing how the attribute QC tool 25 provides updated attribute values to the store attributes tool 39 and feedback information 44 to the attribute machine learning system 37. In this example, the attribute machine learning system 37 incorrectly identified the neckline attribute as having a "SCOOP" attribute value (see FIG. 6). During user review via the attribute QC tool 25, the neckline attribute is assigned a "SQUARE" attribute value. Reference numeral 98 identifies the updated "SQUARE" attribute value that is forwarded to the store attributes tool 39. Reference numeral 99 identifies a failure flag provided by the attribute QC tool 25 to the attribute machine learning system 37 as part of the feedback information 44. The other two attribute values are confirmed to be correct during user review. The attribute QC tool 25 communicates pass flags to the attribute machine learning system 37 and forwards the correctly predicted attribute values to the store attributes tool 39. In some embodiments, the attribute machine learning system 37 uses the feedback information 44 to adjust internal weights and improve operation of the attribute machine learning system 37.

Figure 8:
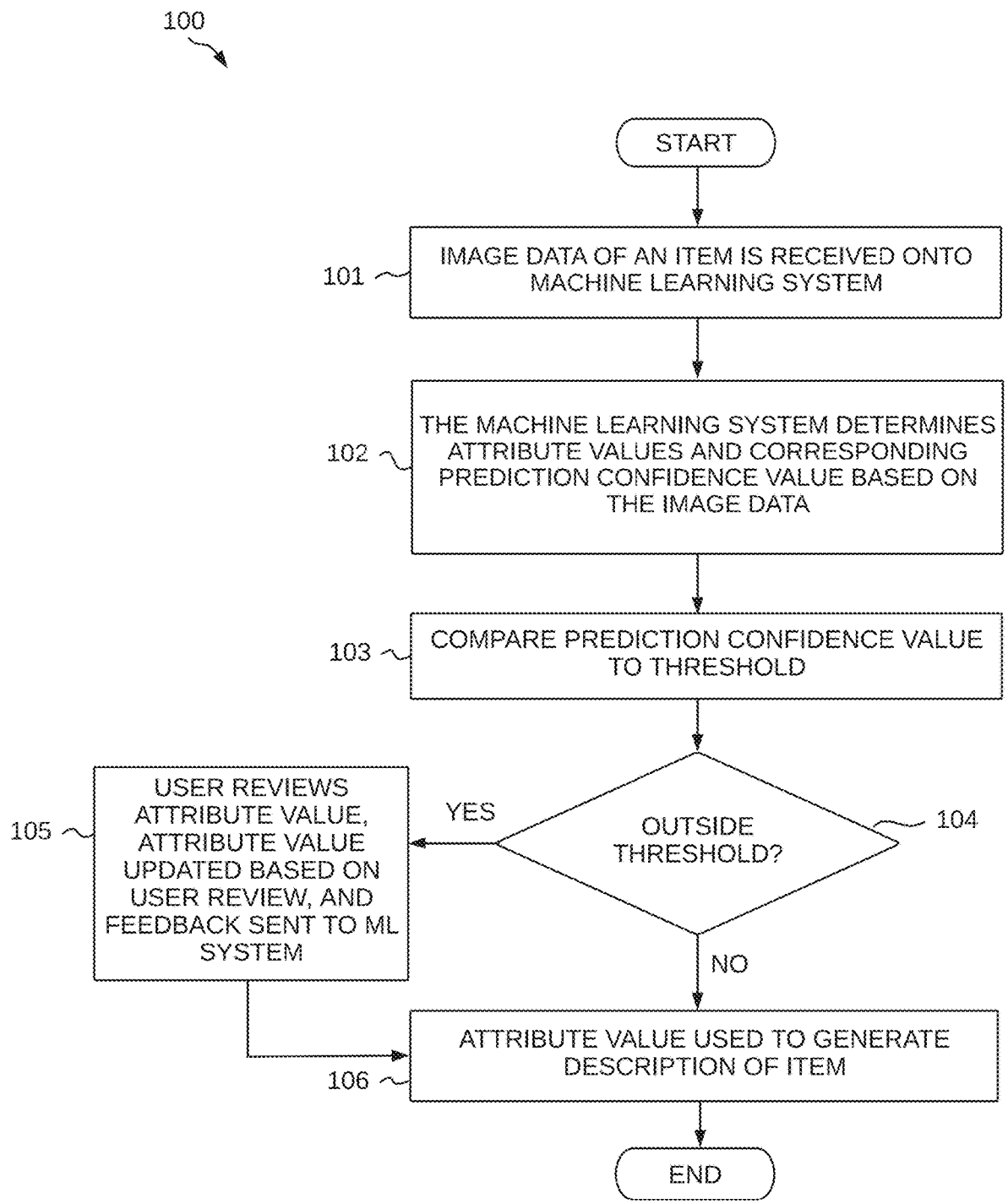
FIG. 8 is a flowchart of a method 100 in accordance with one novel aspect.

FIG. 8 is a flowchart of a method 100 in accordance with one novel aspect. In a first step (step 101), image data of an item is received onto a attribute machine learning system. The image data includes one or more views of the item.

In a second step (step 102), the attribute machine learning system determines one or more attribute values and prediction confidence values based on the one or more images. Each attribute value has a corresponding prediction confidence value that indicates the attribute machine learning system's confidence in the predicted attributed value.

In a third step (step 103), the prediction confidence value is compared to a threshold.

In a fourth step (step 104), a determination is made as to whether the prediction confidence value is less than the threshold. If it is determined that the prediction confidence value is outside of the threshold, then the method 100 proceeds to block 105 for user review. If, on the other hand, it is determined that the prediction confidence value is within the threshold, then the method 100 proceeds to block 106.

In a fifth step (step 105), the attribute value is subject to user review. For example, a user reviews images of items all having the same attribute value. Feedback is provided to the attribute machine learning system based on the user review.

In a sixth step (step 106), the attribute values output from user review and attribute values that bypass user review are used to generate a description of the item. For example, the attribute values generated with and without user review are used to populate description fields in a PDP for an item.

Figure 9:
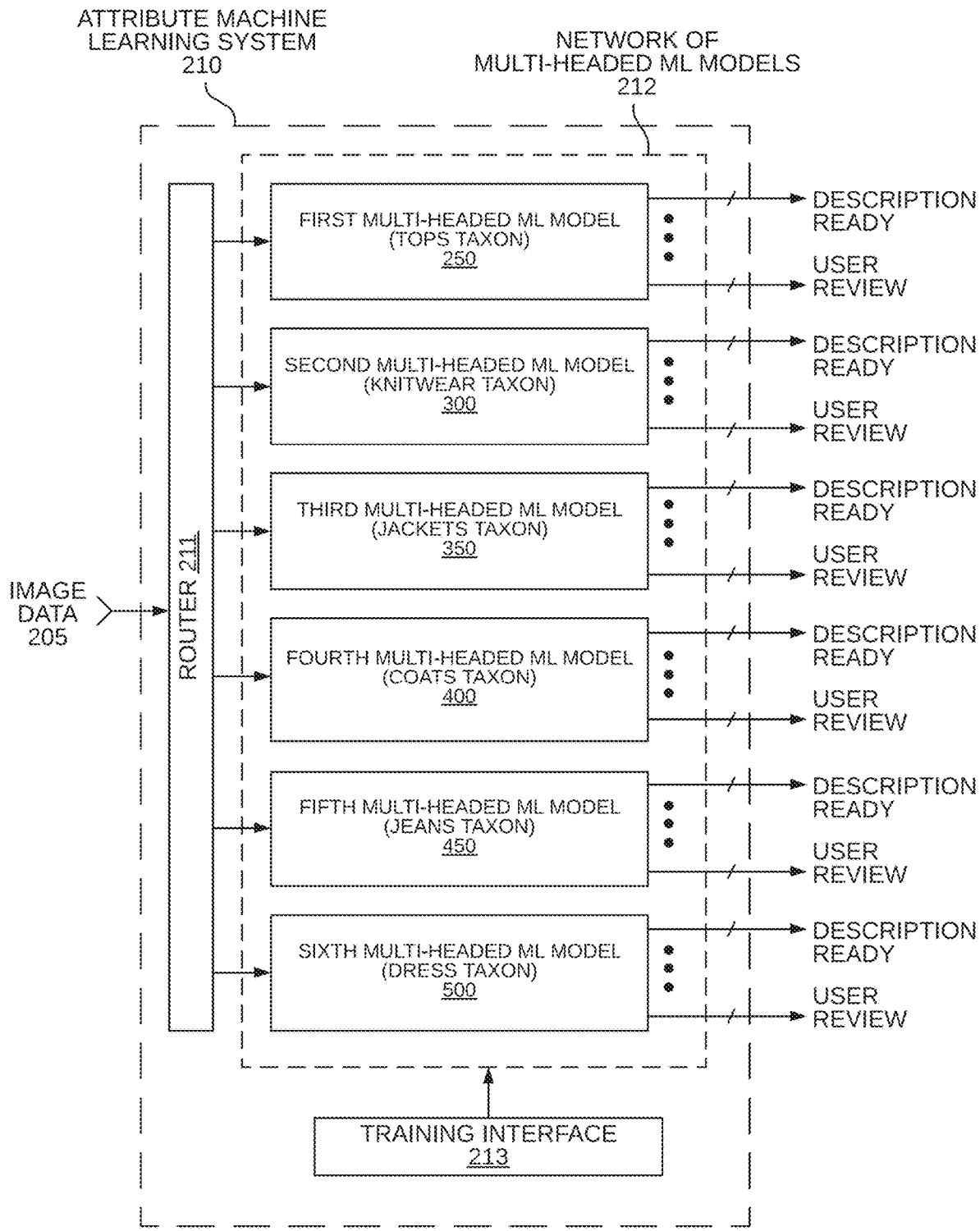
FIG. 9 is a diagram of an attribute machine learning system 210 in accordance with one embodiment.

FIG. 9 is a diagram of an attribute machine learning system 210 in accordance with one embodiment. The attribute machine learning system 210 is another example of the attribute machine learning system 37 shown in FIG. 4. The attribute machine learning system 210 comprises a router 211, a network of multi-headed machine learning models 212, and a training interface 213. In this embodiment, the network of multi-headed machine learning models 212 comprises a first multi-headed machine learning model 250, a second multi-headed machine learning model 300, a third multi-headed machine learning model 350, a fourth multi-headed machine learning model 400, a fifth multi-headed machine learning model 450, and a sixth multi-headed machine learning model 500.

The router 211 receives image data 205 and routes the image data 205 to one of the multi-headed machine learning models 250, 300, 350, 400, 450, or 500. In one embodiment, image data 205 includes a tag and the router 211 supplies the image data 205 to an appropriate head based on the tag. It is appreciated that this technique is applicable to other taxons or attributes and those shown in this example are but one example. The novel attribute machine learning system 210 is usable in other applications unrelated to apparel to detect attributes and generate descriptions for any type of content.

Figure 10:
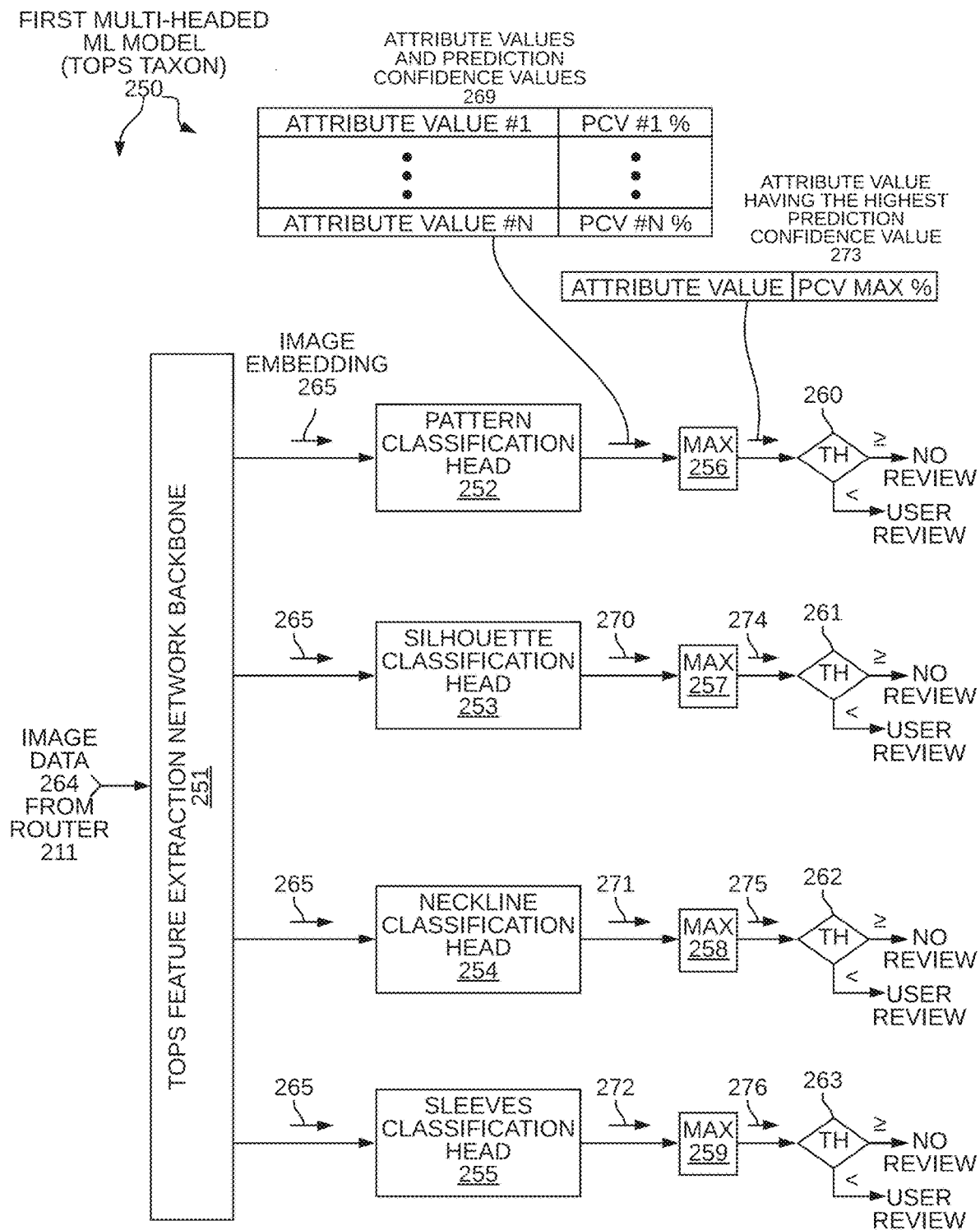
FIG. 10 is a diagram of the first multi-headed machine learning model 250.

FIG. 10 is a diagram of the first multi-headed machine learning model 250. In this embodiment, the first multi-headed machine learning model 250 is trained to analyze upper body clothing items identified as taxon type "TOPS". The first multi-headed machine learning model 250 comprises a tops feature extraction network backbone 251, a pattern classification head 252, a silhouette classification head 253, a neckline classification head 254, a sleeves classification head 255, predicted attribute blocks 256-259, and threshold blocks 260-263. In operation, the tops feature extraction network backbone 251 receives image data 264 from the router 211. The tops feature extraction network backbone 251 generates image embedding 265.

Next, the tops feature extraction network backbone 251 supplies the image embedding 265 to each of the classification heads 252-255. The tops feature extraction network backbone 251 supplies the image embedding 265 to the pattern classification head 252. The tops feature extraction network backbone 251 supplies the image embedding 265 to the silhouette classification head 253. The tops feature extraction network backbone 251 supplies the image embedding 265 to the neckline classification head 254. The tops feature extraction network backbone 251 supplies the image embedding 265 to the sleeves classification head 255.

Next, each of the classification heads 252-255 receives the image embedding 265 and generates two or more attribute values and corresponding prediction confidence values. The pattern classification head 252 generates attribute values and corresponding prediction confidence values 269. The silhouette classification head 253 generates attribute values and corresponding prediction confidence values 270. The neckline classification head 254 generates attribute values and corresponding prediction confidence values 271. The sleeves classification head 255 generates attribute values and corresponding prediction confidence values 272. The attribute values and corresponding prediction confidence values 269 for the pattern classification head 252 are shown as a table for explanatory purposes. The other attribute values and corresponding prediction confidence values 270-272 are not shown for the other classification heads 253-255.

Next, each of the classification heads supplies the generated attribute values and corresponding prediction confidence values to a predicted attribute block. The pattern classification head 252 supplies attribute values and corresponding prediction confidence values 269 to predicted attribute block 256. The silhouette classification head 253 supplies attribute values and corresponding prediction confidence values 270 to predicted attribute block 257. The neckline classification head 254 supplies attribute values and corresponding prediction confidence values 271 to predicted attribute block 258. The sleeves classification head 255 supplies attribute values and corresponding prediction confidence values 272 to predicted attribute block 259.

Next, each of the predicted attribute blocks identifies the attribute value having the highest prediction confidence value. Reference numeral 273 identifies the attribute value having the highest prediction confidence value output by the pattern classification head 252. Reference numeral 274 identifies the attribute value having the highest prediction confidence value output by the silhouette classification head 253. Reference numeral 275 identifies the attribute value having the highest prediction confidence value output by the neckline classification head 254. Reference numeral 276 identifies the attribute value having the highest prediction confidence value output by the sleeves classification head 255.

Next, each of the threshold blocks determines whether or not the highest prediction confidence value requires user review. The threshold limit of each of the threshold blocks 260-263 is preset by the user. For example, if the highest prediction confidence value is less than the threshold limit, user review is required.

Figure 11:
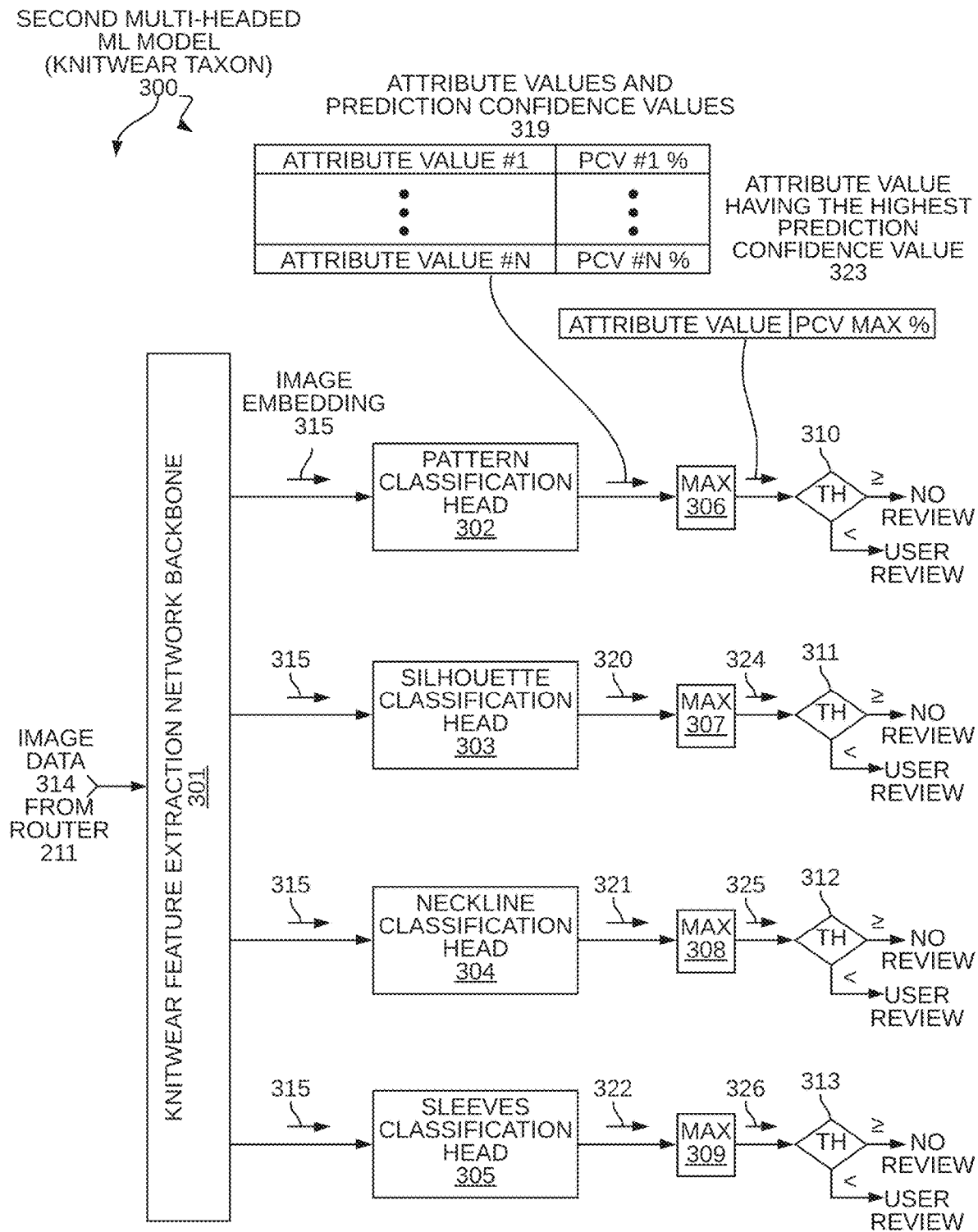
FIG. 11 is a diagram of the second multi-headed machine learning model 300.

FIG. 11 is a diagram of the second multi-headed machine learning model 300. In this embodiment, the second multi-headed machine learning model 300 is trained to analyze clothing items identified as taxon type "KNITWEAR". The second multi-headed machine learning model 300 comprises a knitwear feature extraction network backbone 301, a pattern classification head 302, a silhouette classification head 303, a neckline classification head 304, a sleeves classification head 305, predicted attribute blocks 306-309, and threshold blocks 310-313. In operation, the knitwear feature extraction network backbone 301 receives image data 314 from the router 211. The knitwear feature extraction network backbone 301 generates image embedding 315.

Next, the knitwear feature extraction network backbone 301 supplies the image embedding 315 to each of the classification heads 302-305. The knitwear feature extraction network backbone 301 supplies the image embedding 315 to the pattern classification head 302. The knitwear feature extraction network backbone 301 supplies the image embedding 315 to the silhouette classification head 303. The knitwear feature extraction network backbone 301 supplies the image embedding 315 to the neckline classification head 304. The knitwear feature extraction network backbone 301 supplies the image embedding 315 to the sleeves classification head 305.

Next, each of the classification heads 302-305 receives the image embedding 315 and generates two or more attribute values and corresponding prediction confidence values. The pattern classification head 302 generates attribute values and corresponding prediction confidence values 319. The silhouette classification head 303 generates attribute values and corresponding prediction confidence values 320. The neckline classification head 304 generates attribute values and corresponding prediction confidence values 321. The sleeves classification head 305 generates attribute values and corresponding prediction confidence values 322. The attribute values and corresponding prediction confidence values 319 for the pattern classification head 302 are shown as a table for explanatory purposes. The other attribute values and corresponding prediction confidence values 320-322 are not shown for the other classification heads 303-305.

Next, each of the classification heads supplies the generated attribute values and corresponding prediction confidence values to a predicted attribute block. The pattern classification head 302 supplies attribute values and corresponding prediction confidence values 319 to predicted attribute block 306. The silhouette classification head 303 supplies attribute values and corresponding prediction confidence values 320 to predicted attribute block 307. The neckline classification head 304 supplies attribute values and corresponding prediction confidence values 321 to predicted attribute block 308. The sleeves classification head 305 supplies attribute values and corresponding prediction confidence values 322 to predicted attribute block 309.

Next, each of the predicted attribute blocks identifies the attribute value having the highest prediction confidence value. Reference numeral 323 identifies the attribute value having the highest prediction confidence value output by the pattern classification head 302. Reference numeral 324 identifies the attribute value having the highest prediction confidence value output by the silhouette classification head 303. Reference numeral 325 identifies the attribute value having the highest prediction confidence value output by the neckline classification head 304. Reference numeral 326 identifies the attribute value having the highest prediction confidence value output by the sleeves classification head 305.

Next, each of the threshold blocks determines whether or not the highest prediction confidence value requires user review. The threshold limit of each of the threshold blocks 310-313 is preset by the user. For example, if the highest prediction confidence value is less than the threshold limit, user review is required.

Figure 12:
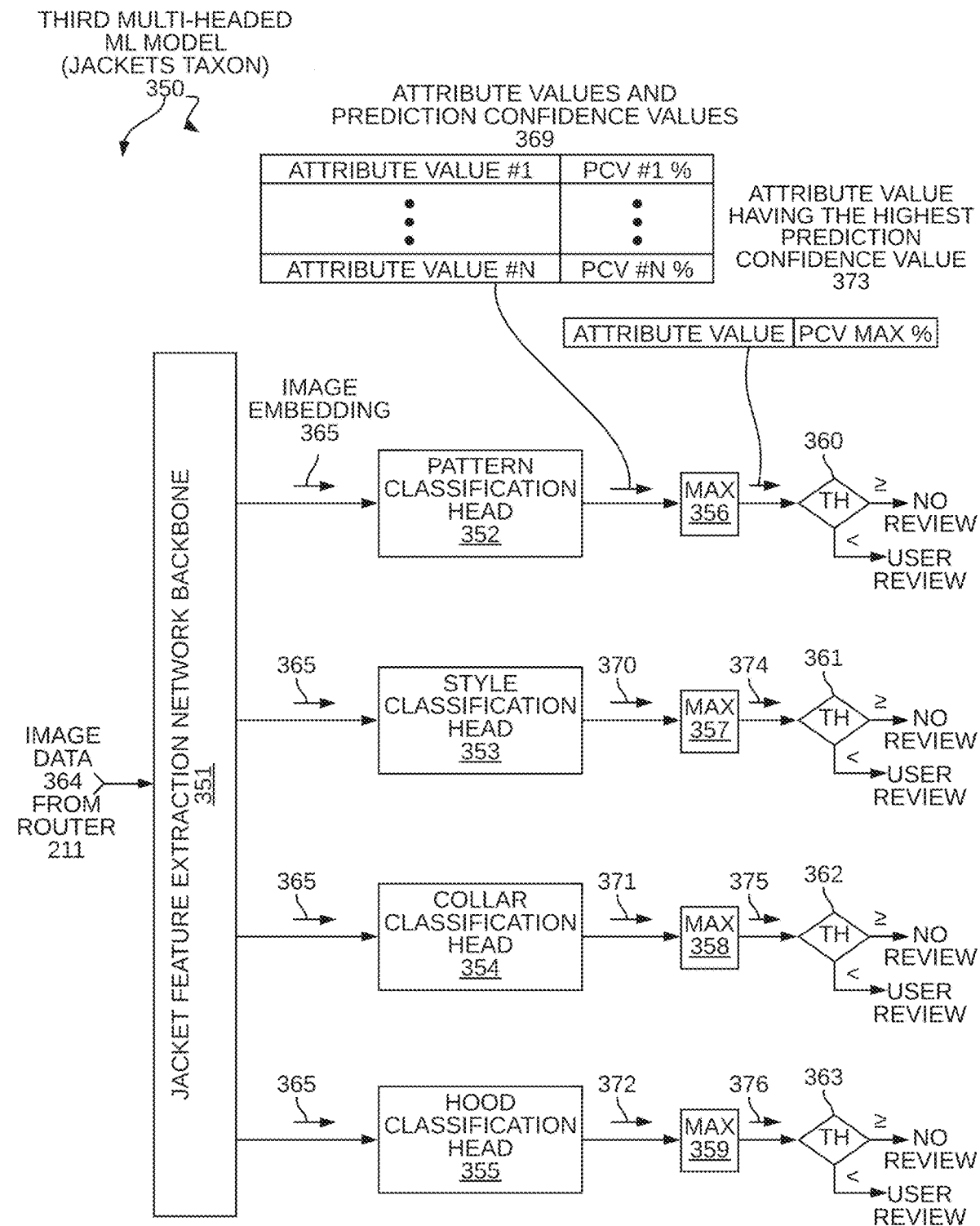
FIG. 12 is a diagram of the third multi-headed machine learning model 350.

FIG. 12 is a diagram of the third multi-headed machine learning model 350. In this embodiment, the third multi-headed machine learning model 350 is trained to analyze clothing items identified as taxon type "jackets". The third multi-headed machine learning model 350 comprises a jackets feature extraction network backbone 351, a pattern classification head 352, a style classification head 353, a collar classification head 354, a hood classification head 355, predicted attribute blocks 356-359, and threshold blocks 360-363. In operation, the jackets feature extraction network backbone 351 receives image data 364 from the router 211. The jackets feature extraction network backbone 351 generates image embedding 365.

Next, the jackets feature extraction network backbone 351 supplies the image embedding 365 to each of the classification heads 352-355. The jackets feature extraction network backbone 351 supplies the image embedding 365 to the pattern classification head 352. The jackets feature extraction network backbone 351 supplies the image embedding 365 to the style classification head 353. The jackets feature extraction network backbone 351 supplies the image embedding 365 to the collar classification head 354. The jackets feature extraction network backbone 351 supplies the image embedding 365 to the hood classification head 355.

Next, each of the classification heads 352-355 receives the image embedding 365 and generates two or more attribute values and corresponding prediction confidence values. The pattern classification head 352 generates attribute values and corresponding prediction confidence values 369. The style classification head 353 generates attribute values and corresponding prediction confidence values 370. The collar classification head 354 generates attribute values and corresponding prediction confidence values 371. The hood classification head 355 generates attribute values and corresponding prediction confidence values 372. The attribute values and corresponding prediction confidence values 369 for the pattern classification head 352 are shown as a table for explanatory purposes. The other attribute values and corresponding prediction confidence values 370-372 are not shown for the other classification heads 353-355.

Next, each of the classification heads supplies the generated attribute values and corresponding prediction confidence values to a predicted attribute block. The pattern classification head 352 supplies attribute values and corresponding prediction confidence values 369 to predicted attribute block 356. The style classification head 353 supplies attribute values and corresponding prediction confidence values 370 to predicted attribute block 357. The collar classification head 354 supplies attribute values and corresponding prediction confidence values 371 to predicted attribute block 358. The hood classification head 355 supplies attribute values and corresponding prediction confidence values 372 to predicted attribute block 359.

Next, each of the predicted attribute blocks identifies the attribute value having the highest prediction confidence value. Reference numeral 373 identifies the attribute value having the highest prediction confidence value output by the pattern classification head 352. Reference numeral 374 identifies the attribute value having the highest prediction confidence value output by the style classification head 353. Reference numeral 375 identifies the attribute value having the highest prediction confidence value output by the collar classification head 354. Reference numeral 376 identifies the attribute value having the highest prediction confidence value output by the hood classification head 355.

Next, each of the threshold blocks determines whether or not the highest prediction confidence value requires user review. The threshold limit of each of the threshold blocks 360-363 is preset by the user. For example, if the highest prediction confidence value is less than the threshold limit, user review is required.

Figure 13:
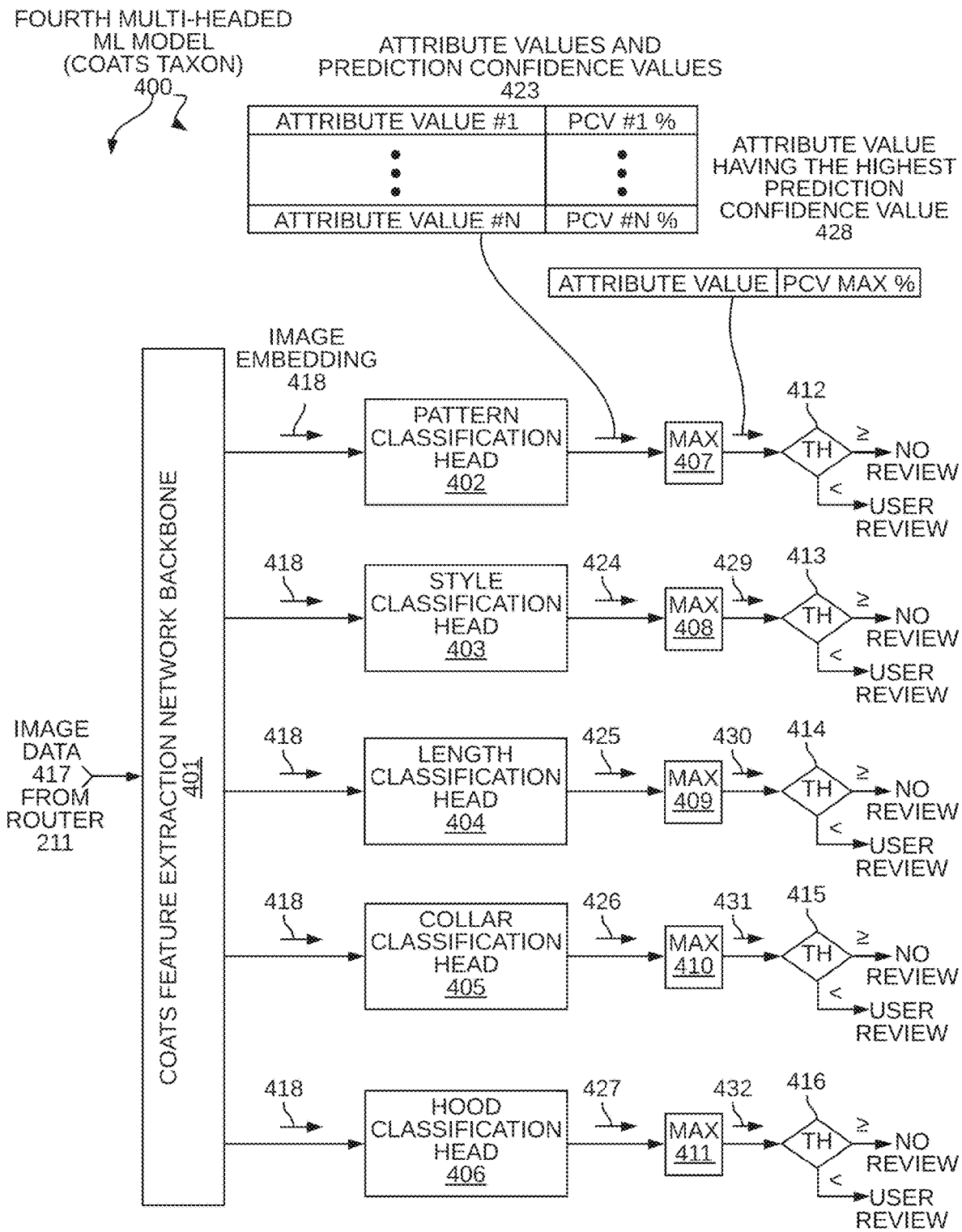
FIG. 13 is a diagram of the fourth multi-headed machine learning model 400.

FIG. 13 is a diagram of the fourth multi-headed machine learning model 400. In this embodiment, the fourth multi-headed machine learning model 400 is trained to analyze clothing items identified as taxon type "coats". The fourth multi-headed machine learning model 400 comprises a coats feature extraction network backbone 401, a pattern classification head 402, a style classification head 403, a length classification head 404, a collar classification head 405, a hood classification head 406, predicted attribute blocks 407-411, and threshold blocks 412-416. In operation, the coats feature extraction network backbone 401 receives image data 417 from the router 211. The coats feature extraction network backbone 401 generates image embedding 418.

Next, the coats feature extraction network backbone 401 supplies the image embedding 418 to each of the classification heads 402-406. The coats feature extraction network backbone 401 supplies the image embedding 418 to the pattern classification head 402. The coats feature extraction network backbone 401 supplies the image embedding 418 to the style classification head 403. The coats feature extraction network backbone 401 supplies the image embedding 418 to the length classification head 404. The coats feature extraction network backbone 401 supplies the image embedding 418 to the collar classification head 405. The coats feature extraction network backbone 401 supplies the image embedding 418 to the hood classification head 406.

Next, each of the classification heads 402-406 receives the image embedding 418 and generates two or more attribute values and corresponding prediction confidence values. The pattern classification head 402 generates attribute values and corresponding prediction confidence values 423. The style classification head 403 generates attribute values and corresponding prediction confidence values 424. The length classification head 404 generates attribute values and corresponding prediction confidence values 425. The collar classification head 405 generates attribute values and corresponding prediction confidence values 426. The hood classification head 406 generates attribute values and corresponding prediction confidence values 427. The attribute values and corresponding prediction confidence values 423 for the pattern classification head 402 are shown as a table for explanatory purposes. The other attribute values and corresponding prediction confidence values 424-427 are not shown for the other classification heads 403-406.

Next, each of the classification heads supplies the generated attribute values and corresponding prediction confidence values to a predicted attribute block. The pattern classification head 402 supplies attribute values and corresponding prediction confidence values 423 to predicted attribute block 407. The style classification head 403 supplies attribute values and corresponding prediction confidence values 424 to predicted attribute block 408. The length classification head 404 supplies attribute values and corresponding prediction confidence values 425 to predicted attribute block 409. The collar classification head 405 supplies attribute values and corresponding prediction confidence values 426 to predicted attribute block 410. The hood classification head 406 supplies attribute values and corresponding prediction confidence values 427 to predicted attribute block 411.

Next, each of the predicted attribute blocks identifies the attribute value having the highest prediction confidence value. Reference numeral 428 identifies the attribute value having the highest prediction confidence value output by the pattern classification head 402. Reference numeral 429 identifies the attribute value having the highest prediction confidence value output by the style classification head 403. Reference numeral 430 identifies the attribute value having the highest prediction confidence value output by the length classification head 404. Reference numeral 431 identifies the attribute value having the highest prediction confidence value output by the collar classification head 405. Reference numeral 432 identifies the attribute value having the highest prediction confidence value output by the hood classification head 406.

Next, each of the threshold blocks determines whether or not the highest prediction confidence value requires user review. The threshold limit of each of the threshold blocks 412-416 is preset by the user. For example, if the highest prediction confidence value is less than the threshold limit, user review is required.

Figure 14:
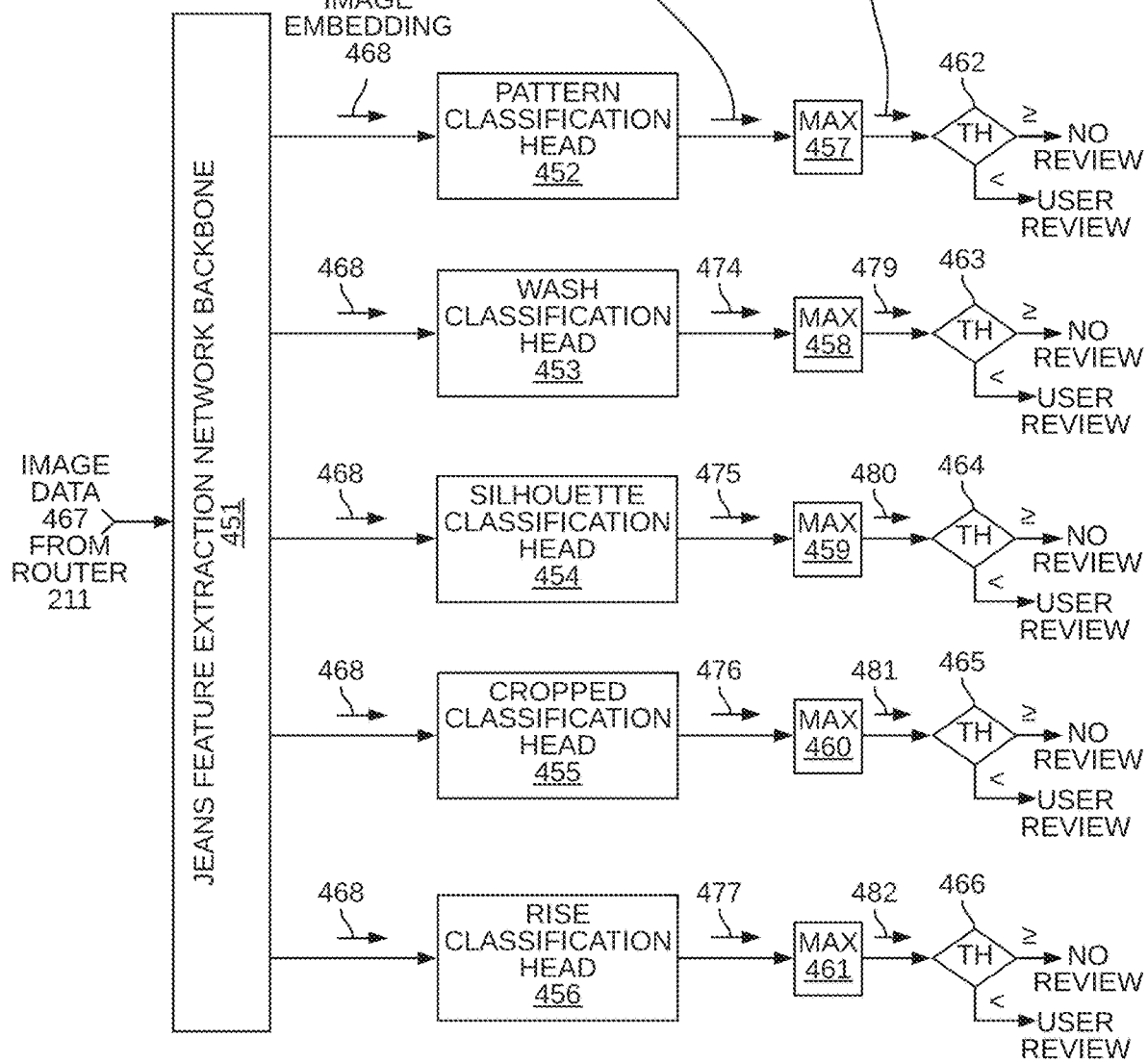
FIG. 14 is a diagram of the fifth multi-headed machine learning model 450.

FIG. 14 is a diagram of the fifth multi-headed machine learning model 450. In this embodiment, the fifth multi-headed machine learning model 450 is trained to analyze clothing items identified as taxon type "jeans". The fifth multi-headed machine learning model 450 comprises a jeans feature extraction network backbone 451, a pattern classification head 452, a wash classification head 453, a silhouette classification head 454, a cropped classification head 455, a rise classification head 456, predicted attribute blocks 457-461, and threshold blocks 462-466. In operation, the jeans feature extraction network backbone 451 receives image data 467 from the router 211. The jeans feature extraction network backbone 451 generates image embedding 468.

Next, the jeans feature extraction network backbone 451 supplies the image embedding 468 to each of the classification heads 452-456. The jeans feature extraction network backbone 451 supplies the image embedding 468 to the pattern classification head 452. The jeans feature extraction network backbone 451 supplies the image embedding 468 to the wash classification head 453. The jeans feature extraction network backbone 451 supplies the image embedding 468 to the silhouette classification head 454. The jeans feature extraction network backbone 451 supplies the image embedding 468 to the cropped classification head 455. The jeans feature extraction network backbone 451 supplies the image embedding 468 to the rise classification head 456.

Next, each of the classification heads 452-456 receives the image embedding 468 and generates two or more attribute values and corresponding prediction confidence values. The pattern classification head 452 generates attribute values and corresponding prediction confidence values 473. The wash classification head 453 generates attribute values and corresponding prediction confidence values 474. The silhouette classification head 454 generates attribute values and corresponding prediction confidence values 475. The cropped classification head 455 generates attribute values and corresponding prediction confidence values 476. The rise classification head 456 generates attribute values and corresponding prediction confidence values 477. The attribute values and corresponding prediction confidence values 473 for the pattern classification head 452 are shown as a table for explanatory purposes. The other attribute values and corresponding prediction confidence values 474-477 are not shown for the other classification heads 453-456.

Next, each of the classification heads supplies the generated attribute values and corresponding prediction confidence values to a predicted attribute block. The pattern classification head 452 supplies attribute values and corresponding prediction confidence values 473 to predicted attribute block 457. The wash classification head 453 supplies attribute values and corresponding prediction confidence values 474 to predicted attribute block 458. The silhouette classification head 454 supplies attribute values and corresponding prediction confidence values 475 to predicted attribute block 459. The cropped classification head 455 supplies attribute values and corresponding prediction confidence values 476 to predicted attribute block 460. The rise classification head 456 supplies attribute values and corresponding prediction confidence values 477 to predicted attribute block 461.

Next, each of the predicted attribute blocks identifies the attribute value having the highest prediction confidence value. Reference numeral 478 identifies the attribute value having the highest prediction confidence value output by the pattern classification head 452. Reference numeral 479 identifies the attribute value having the highest prediction confidence value output by the wash classification head 453. Reference numeral 480 identifies the attribute value having the highest prediction confidence value output by the silhouette classification head 454. Reference numeral 481 identifies the attribute value having the highest prediction confidence value output by the cropped classification head 455. Reference numeral 482 identifies the attribute value having the highest prediction confidence value output by the rise classification head 456.

Next, each of the threshold blocks determines whether or not the highest prediction confidence value requires user review. The threshold limit of each of the threshold blocks 462-466 is preset by the user. For example, if the highest prediction confidence value is less than the threshold limit, user review is required.

Figure 15:
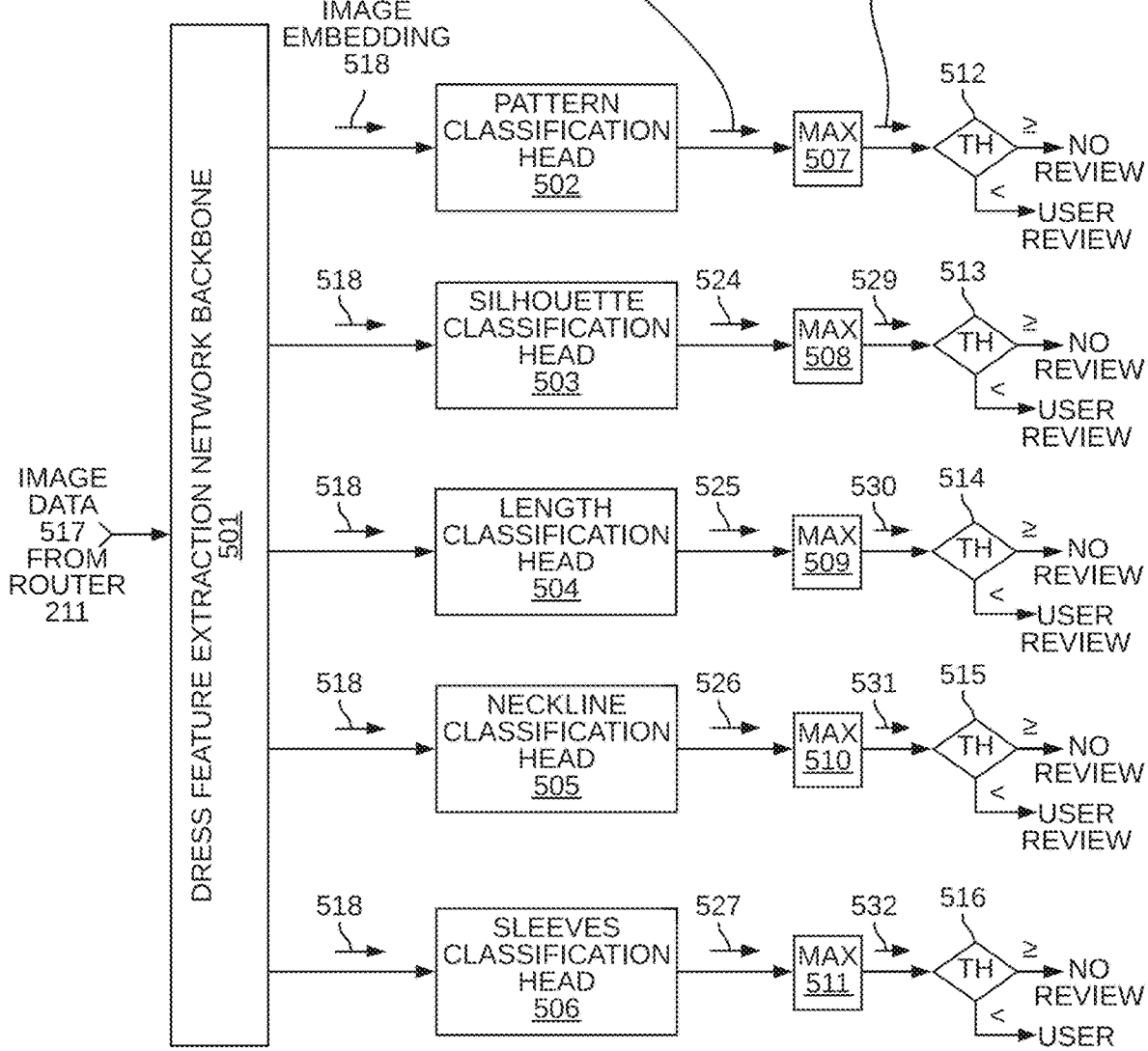
FIG. 15 is a diagram of the sixth multi-headed machine learning model 500.

FIG. 15 is a diagram of the sixth multi-headed machine learning model 500. In this embodiment, the sixth multi-headed machine learning model 500 is trained to analyze clothing items identified as taxon type "dress". The sixth multi-headed machine learning model 500 comprises a dress feature extraction network backbone 501, a pattern classification head 502, a silhouette classification head 503, a length classification head 504, a neckline classification head 505, a sleeves classification head 506, predicted attribute blocks 507-511, and threshold blocks 512-516. In operation, the dress feature extraction network backbone 501 receives image data 517 from the router 211. The dress feature extraction network backbone 501 generates image embedding 518.

Next, the dress feature extraction network backbone 501 supplies the image embedding 518 to each of the classification heads 502-506. The dress feature extraction network backbone 501 supplies the image embedding 518 to the pattern classification head 502. The dress feature extraction network backbone 501 supplies the image embedding 518 to the silhouette classification head 503. The dress feature extraction network backbone 501 supplies the image embedding 518 to the length classification head 504. The dress feature extraction network backbone 501 supplies the image embedding 518 to the neckline classification head 505. The dress feature extraction network backbone 501 supplies the image embedding 518 to the sleeves classification head 506.

Next, each of the classification heads 502-506 receives the image embedding 518 and generates two or more attribute values and corresponding prediction confidence values. The pattern classification head 502 generates attribute values and corresponding prediction confidence values 523. The silhouette classification head 503 generates attribute values and corresponding prediction confidence values 524. The length classification head 504 generates attribute values and corresponding prediction confidence values 525. The neckline classification head 505 generates attribute values and corresponding prediction confidence values 526. The sleeves classification head 506 generates attribute values and corresponding prediction confidence values 527. The attribute values and corresponding prediction confidence values 523 for the pattern classification head 502 are shown as a table for explanatory purposes. The other attribute values and corresponding prediction confidence values 524-527 are not shown for the other classification heads 503-506.

Next, each of the classification heads supplies the generated attribute values and corresponding prediction confidence values to a predicted attribute block. The pattern classification head 502 supplies attribute values and corresponding prediction confidence values 523 to predicted attribute block 507. The silhouette classification head 503 supplies attribute values and corresponding prediction confidence values 524 to predicted attribute block 508. The length classification head 504 supplies attribute values and corresponding prediction confidence values 525 to predicted attribute block 509. The neckline classification head 505 supplies attribute values and corresponding prediction confidence values 526 to predicted attribute block 510. The sleeves classification head 506 supplies attribute values and corresponding prediction confidence values 527 to predicted attribute block 511.

Next, each of the predicted attribute blocks identifies the attribute value having the highest prediction confidence value. Reference numeral 528 identifies the attribute value having the highest prediction confidence value output by the pattern classification head 502. Reference numeral 529 identifies the attribute value having the highest prediction confidence value output by the silhouette classification head 503. Reference numeral 530 identifies the attribute value having the highest prediction confidence value output by the length classification head 504. Reference numeral 531 identifies the attribute value having the highest prediction confidence value output by the neckline classification head 505. Reference numeral 532 identifies the attribute value having the highest prediction confidence value output by the sleeves classification head 506.

Next, each of the threshold blocks determines whether or not the highest prediction confidence value requires user review. The threshold limit of each of the threshold blocks 512-516 is preset by the user. For example, if the highest prediction confidence value is less than the threshold limit, user review is required.

Figure 16:
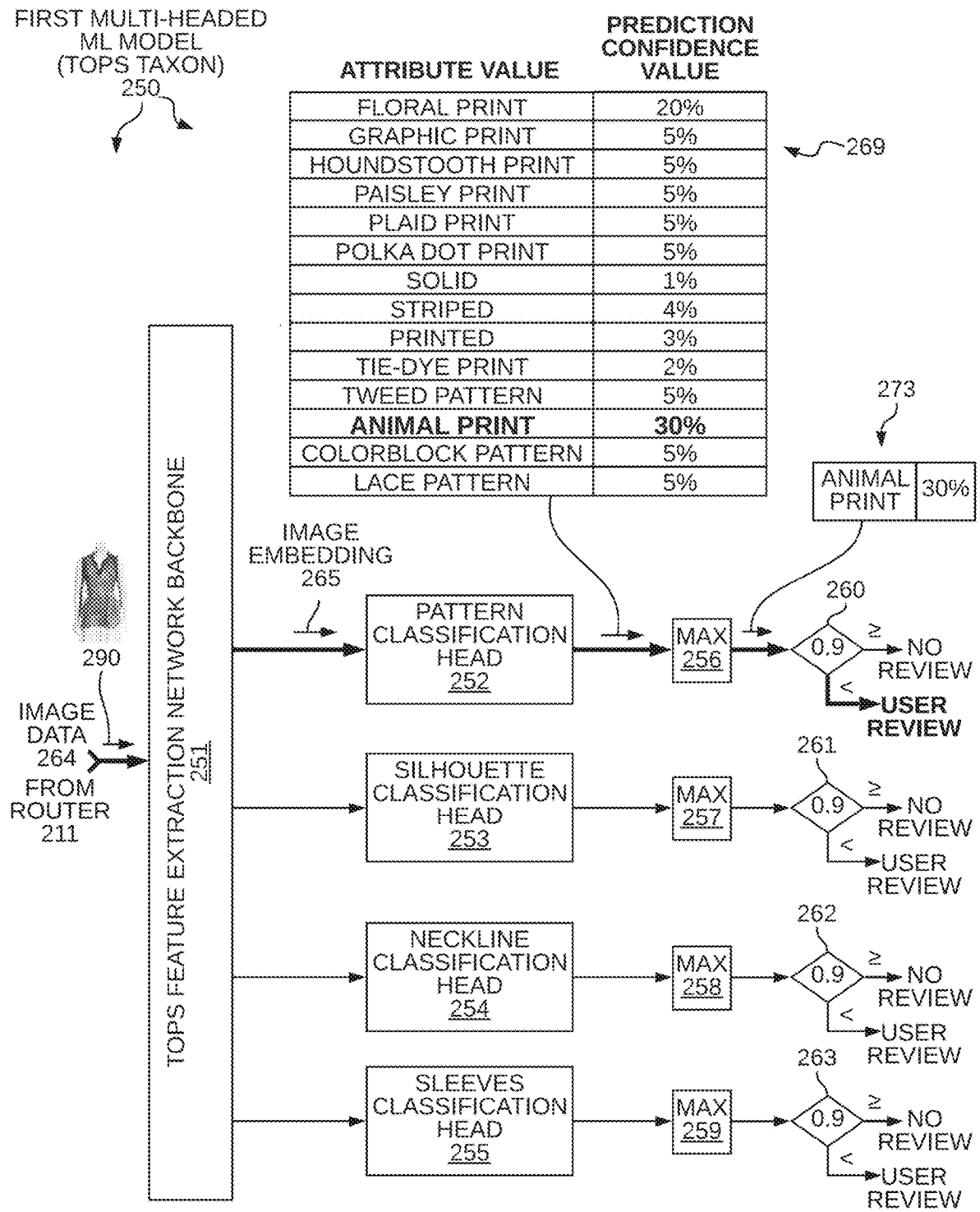
FIG. 16 is a diagram showing the operation of one example of one head of one multi-headed machine learning model.

FIG. 16 is a diagram showing the operation of one example of one head of one multi-headed machine learning model. In this example, pattern classification head 252 of the first multi-headed machine learning model 250 is performing the operation. The tops feature extraction network backbone 251 receives image data 264 for the image 290 from router 211.

Next, the tops feature extraction network backbone 251 generates image embedding 265.

Next, the tops feature extraction network backbone 251 supplies the image embedding 265 to the pattern classification head 252.

Next, pattern classification head 252 receives the image embedding 265 and generates fourteen attribute values and corresponding prediction confidence values, as shown in table 269.

Next, The pattern classification head 252 supplies attribute values and corresponding prediction confidence values 269 to predicted attribute block 256.

Next, the predicted attribute block 256 identifies the attribute value having the highest prediction confidence value. Reference numeral 273 identifies the attribute value having the highest prediction confidence value output by the pattern classification head 252. In this example, "ANIMAL PRINT" is the attribute value having the highest prediction confidence value of 30%.

Next, threshold block 260 receives the attribute value having the highest prediction confidence value output by the pattern classification head 252. Threshold block 260 determines whether or not the highest prediction confidence value requires user review. In this example, the threshold limit of block 260 is preset by the user to be greater than or equal to 90% (0.9). In this example, the threshold block 260 determines the attribute value having the highest prediction confidence value 273 is less than the threshold limit of 0.9 and accordingly user review is required.

Figure 17:
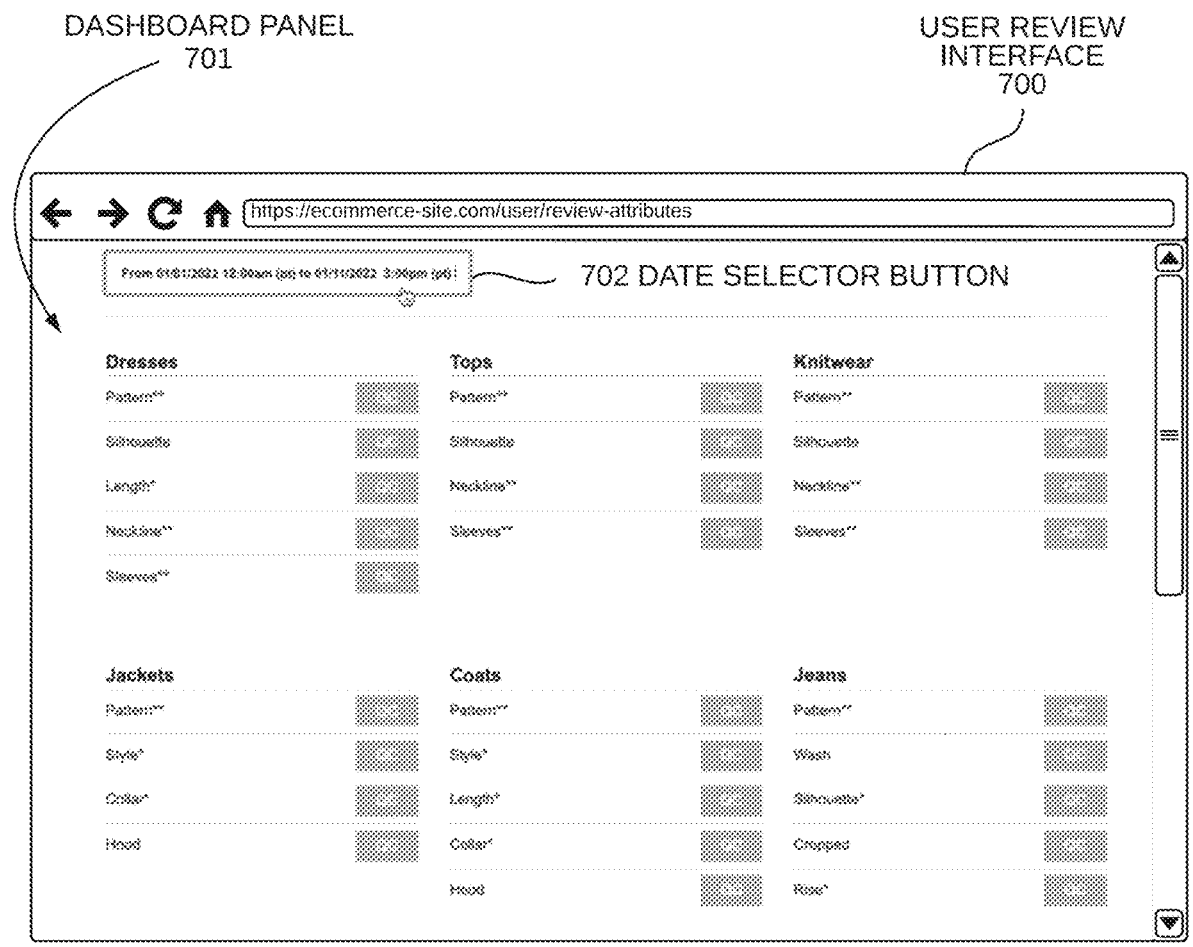
FIG. 17 is a diagram of a user review interface 700 in accordance with one embodiment.

FIG. 17 is a diagram of a user review interface 700 of the attribute QC tool 25 in accordance with one embodiment. The user review interface 700 includes various graphical input elements and panels provided to users as explained below. The user review interface 700 includes a dashboard panel 701 and a date selector button 702. The dashboard panel 701 includes attributes for each taxon of items. For example, for items in the "Dresses" category, a reviewer is able to select and review all images for "Dresses" having the same attributes. The date selector button 702 allows the user to limit review to only images identified within a certain date range.

Figure 18:
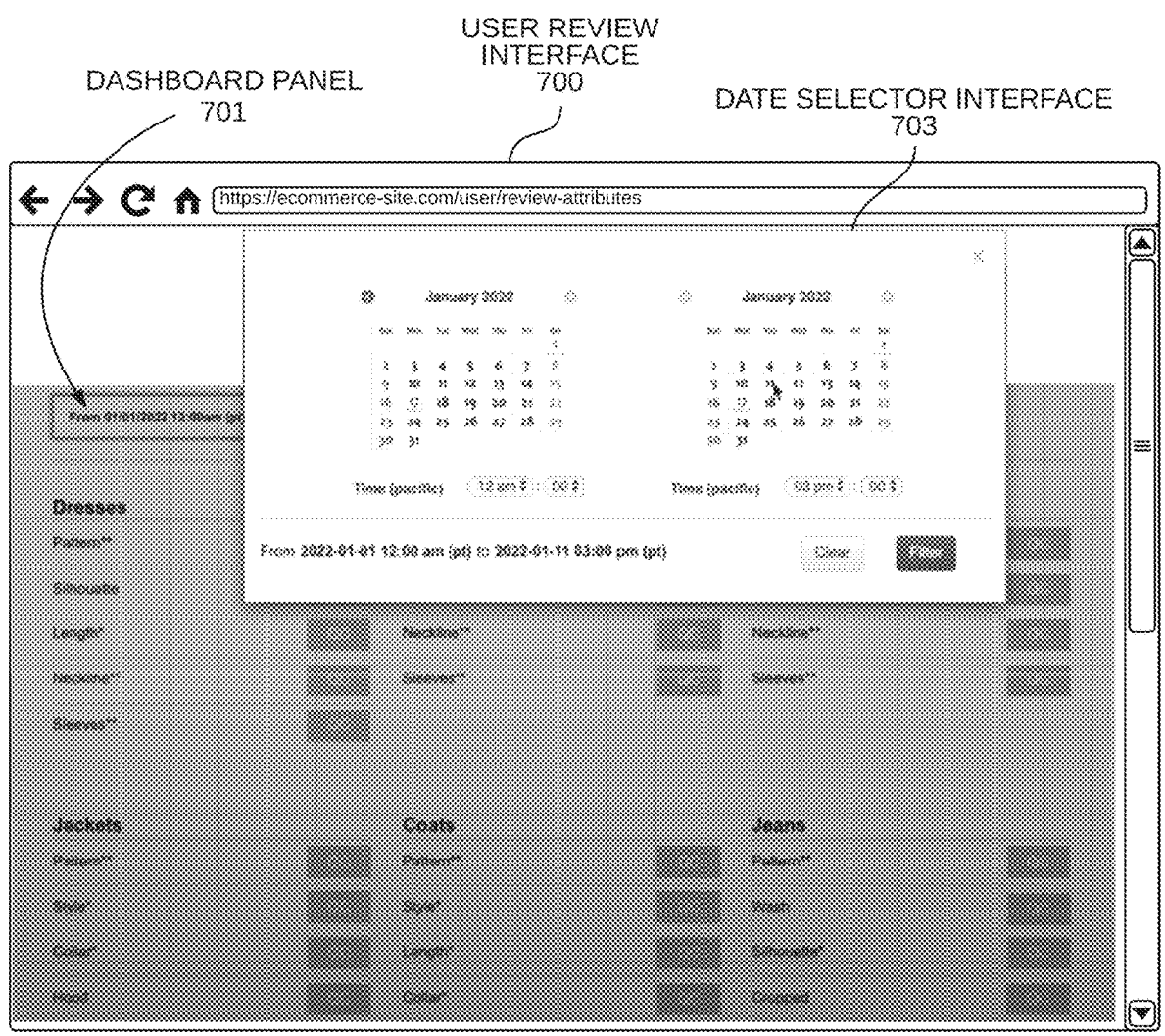
FIG. 18 is a diagram of the date selector interface 703.

FIG. 18 is a diagram of the date selector interface 703. The date selector interface 703 is overlaid above the dashboard panel 701. A user selects a desired date range for review via the date selector interface 703.

Figure 19:
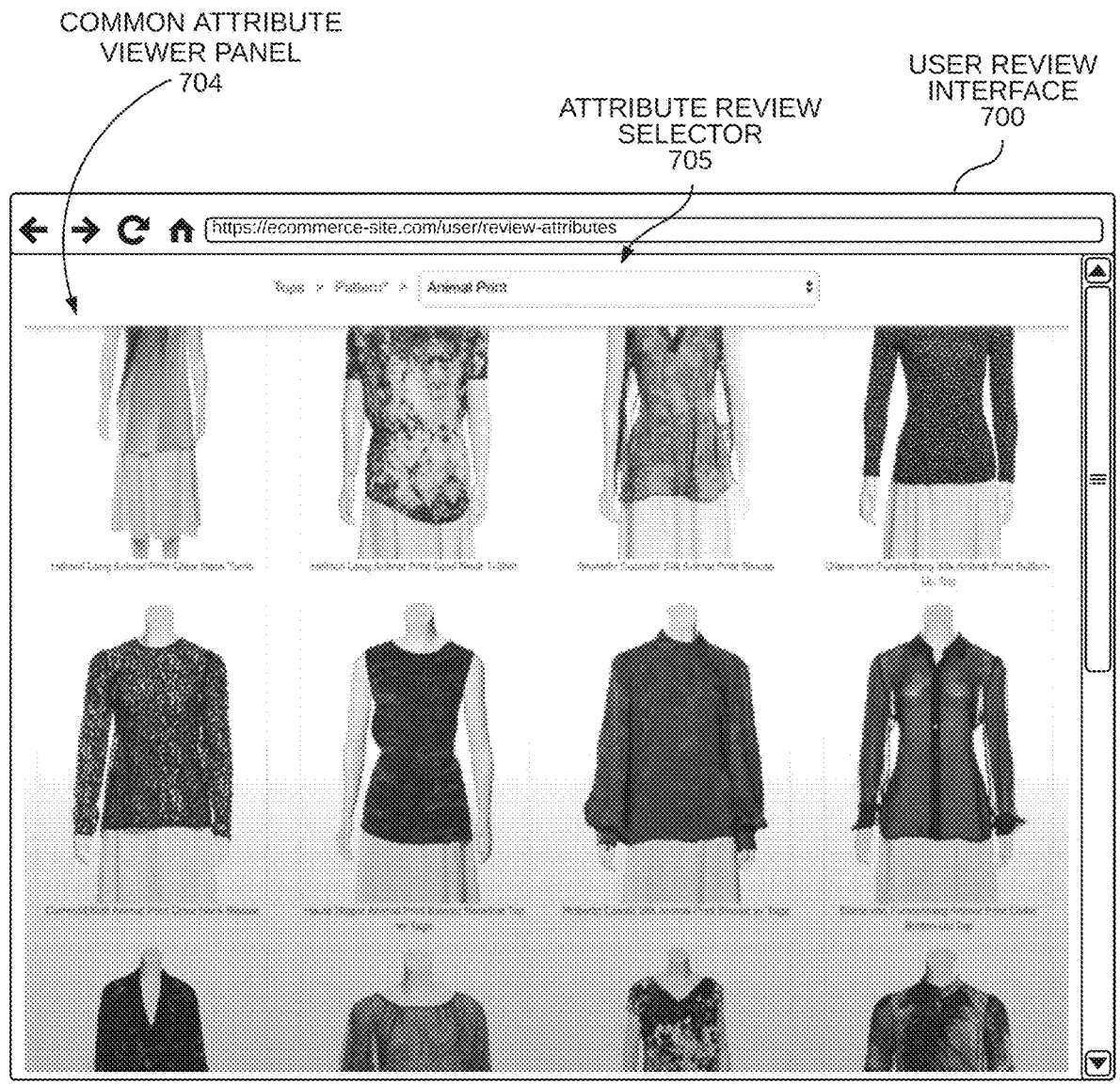
FIG. 19 is a diagram of the common attribute item viewer panel 704 and an attribute review selector 705.

FIG. 19 is a diagram of the common attribute item viewer panel 704 and an attribute review selector 705. The common attribute item viewer panel 704 has one or more images of items determined by the attribute machine learning system 37 to have a common attribute value. In this example, the attribute review selector 705 has "ANIMAL PRINT" selected. All items having the common attribute value of "ANIMAL PRINT" are viewable within the common attribute item viewer panel 704 without needing to toggle between other panels or between other user interface elements. This feature provides a technical advancement in quality control systems that was not available before user review interface 700. By grouping all items having the same attribute value, a user is able to scan through many, many items and identify any misclassified items.

The attribute review selector 705 is used to review items having other common attribute values. Once selected via the attribute review selector 705, the attribute review selector 705 causes all items determined by the attribute machine learning system 37 as having the selected attribute to be shown in the common attribute item viewer panel 704.

Figure 20:
FIG. 20 is a diagram showing operation of a zoom interface 706.

FIG. 20 is a diagram showing operation of a zoom interface 706. When a user moves a selector over an image in the common attribute item viewer panel 704, a zoomed in version of the image is displayed. The zoom interface 706 further allows a user to quickly pan through many images and identify any misclassified items. A mark reviewed button 707 is provided that allows a user to flag an item as reviewed.

Figure 21:
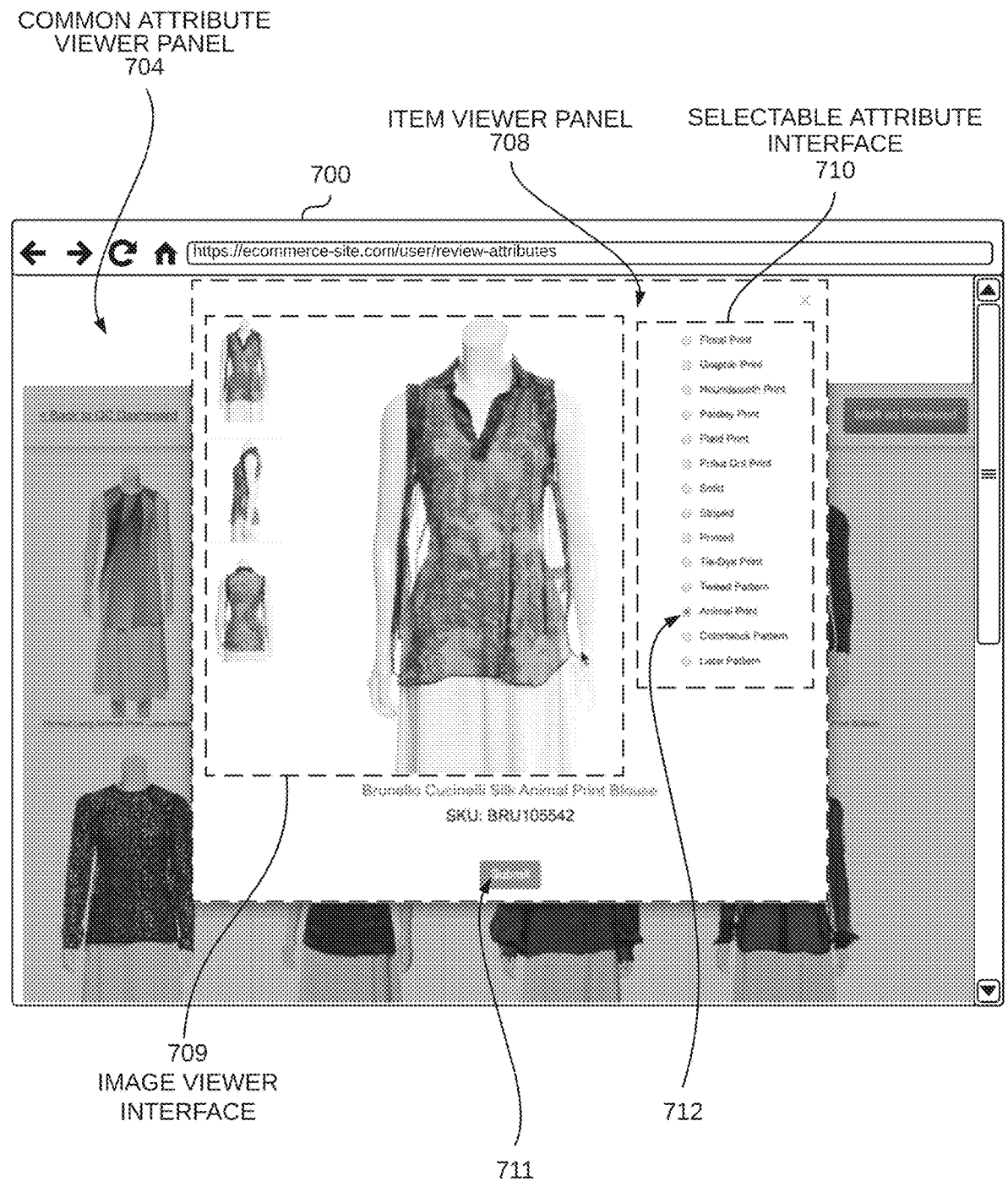
FIG. 21 is a diagram of an item viewer panel 708.

FIG. 21 is a diagram of an item viewer panel 708. The item viewer panel 708 has an image viewer interface 709, a selectable attribute interface 710, and a submission button 711. The image viewer interface 709 is adjacent to the selectable attribute interface 710. When an item is selected, the item viewer panel 708 is overlaid above the common attribute item viewer panel 704. The one or more images of the item are viewable via the image viewer interface 709. One of a plurality of selectable attribute values is selectable via the selectable attribute interface 710. The image viewer interface 709 and the selectable attribute interface 710 are presented simultaneously in the item viewer panel 708 without needing to toggle between other panels or between other user interface elements.

In this example, the attribute machine learning system 37 incorrectly predicted "ANIMAL PRINT" as being the attribute value associated with the item. Reference numeral 712 identifies this attribute. The user is able to quickly change the attribute value using the selectable attribute interface 710.

Figure 22:
FIG. 22 is a diagram showing a zoom interface 713 provided in the item viewer panel 708.

FIG. 22 is a diagram showing a zoom interface 713 provided in the item viewer panel 708. The zoom interface 713 provides a user to see portions of the image in more detail by panning over the image.

Figure 23:
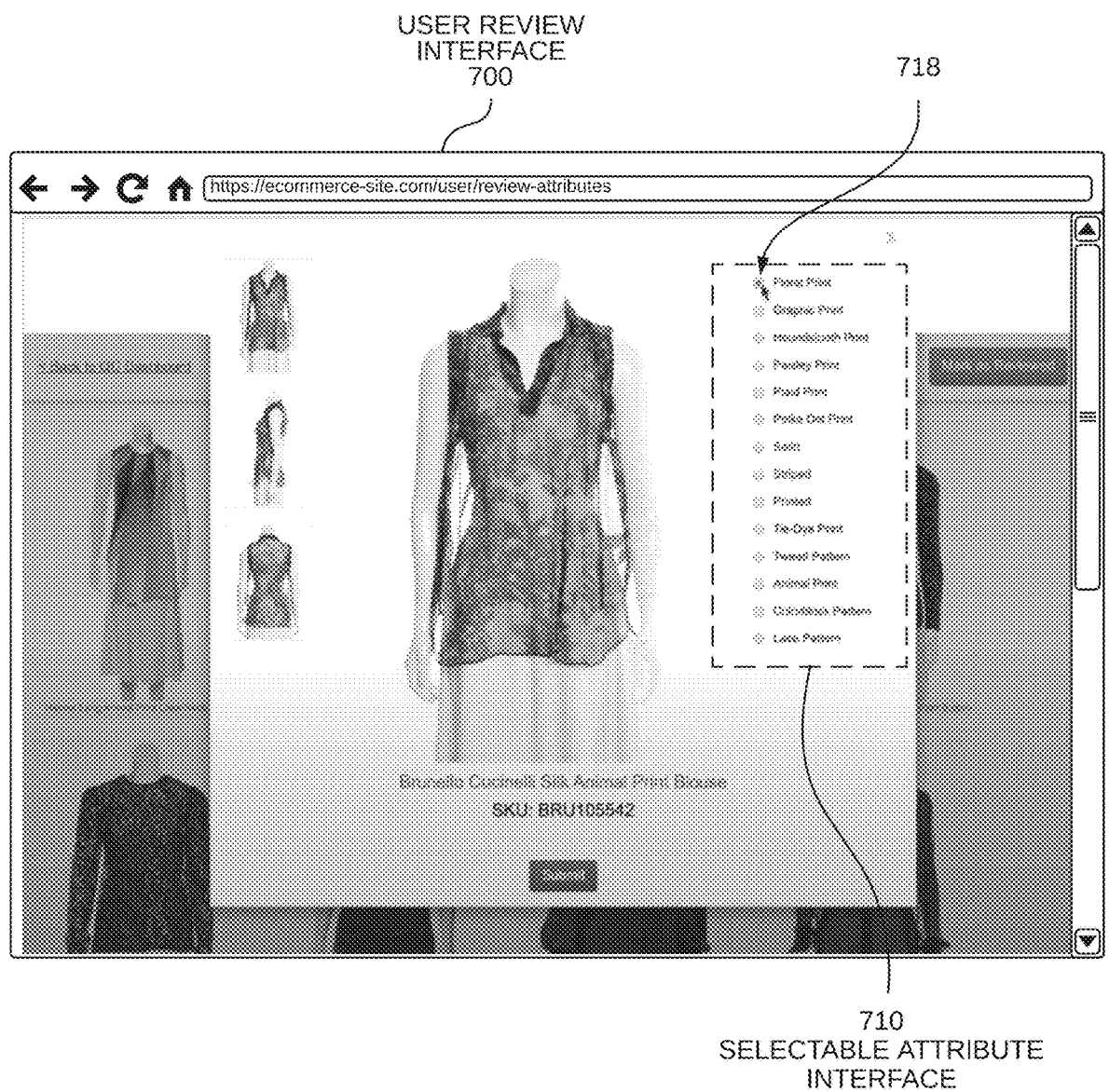
FIG. 23 is a diagram showing how the user is able to select a correct attribute value to be substituted with the attribute value generated by the attribute machine learning system 37.

FIG. 23 is a diagram showing how the user is able to select a correct attribute value to be substituted with the attribute value generated by the attribute machine learning system 37. Each of the selectable attribute values in the selectable attribute interface 710 is selectable in less than two clicks. In this example, the user selected the attribute value "FLORAL PRINT". Reference numeral 718 identifies this attribute. A selected attribute value selected during user review via interface 700 is substituted for the attribute value determined using the attribute machine learning system 37.

Figure 24:
FIG. 24 is a diagram showing how the user submits the attribute value selected via the item viewer panel 708.

FIG. 24 is a diagram showing how the user submits the attribute value selected via the item viewer panel 708. In this example, the user utilizes the submission button 711 to substitute the attribute "FLORAL PRINT" for the attribute value determined using the attribute machine learning system 37.

Figure 25:
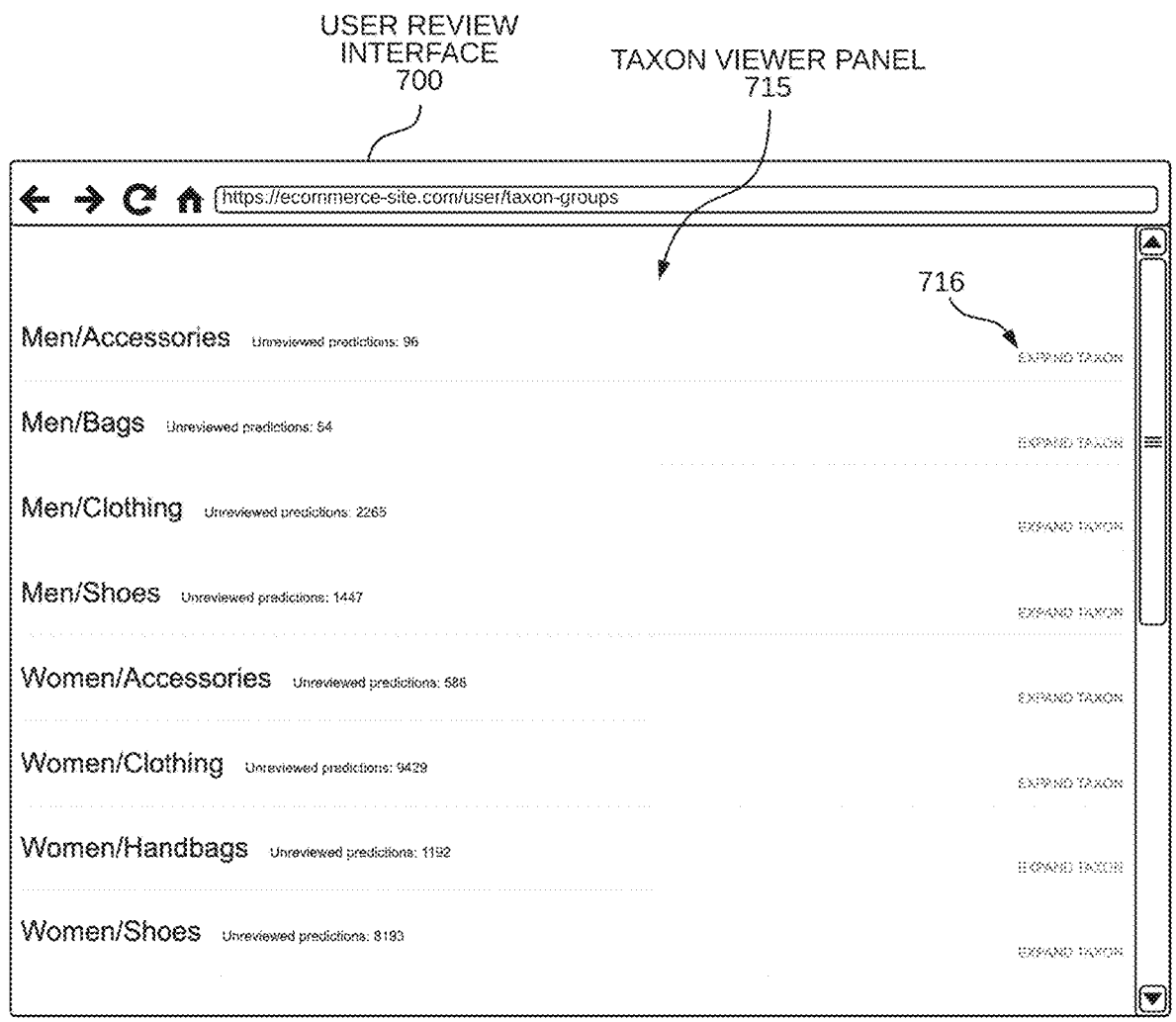
FIG. 25 is a diagram showing a group taxon viewer panel 715.

FIG. 25 is a diagram showing a group taxon viewer panel 715. The taxon viewer panel 715 displays various group taxons and an associated review count indicating the quantity of items needing review. This novel panel allows quality control teams to allocate reviewing resources based on demand and backlog across various taxon groups. An expansion input 716 is provided alongside each taxon group. Selecting the expansion input 716 causes taxons and associated attributes in each taxon group to be displayed on the user review interface 700.

Figure 26:
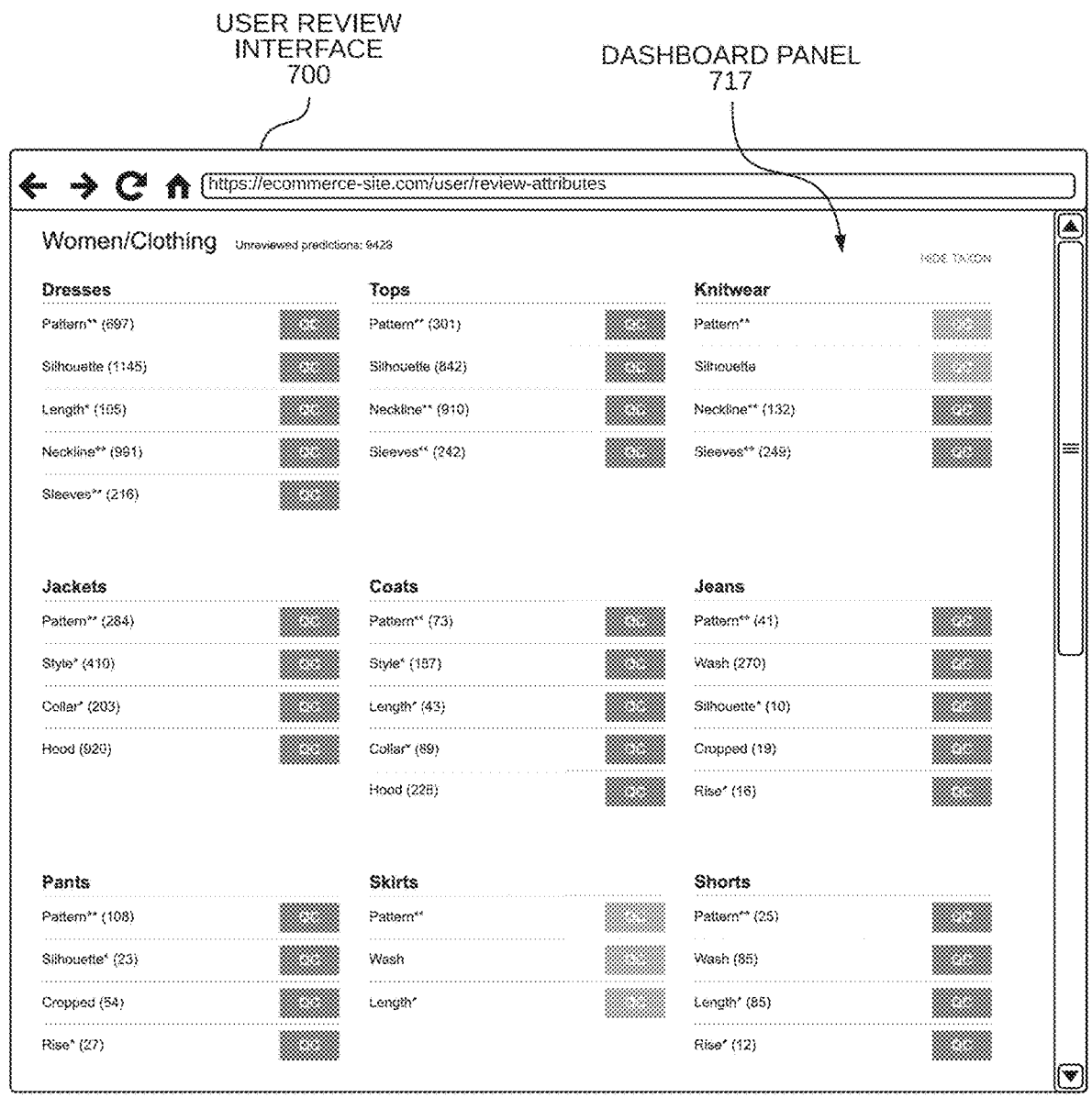
FIG. 26 is a diagram showing a dashboard panel 717.

FIG. 26 is a diagram showing another embodiment of a dashboard panel 717. The dashboard panel 717 includes review count indicating the number of items needing review each attribute across each taxon. For example, expanding Women/Clothing in the group taxon viewer panel 715 of FIG. 25 presents the dashboard panel 717 as shown in FIG. 26. Attributes that do not have any items needing review disable the QC review button. This increases productivity and provides another visual element to distinguish attributes needing user review.

Figure 27:
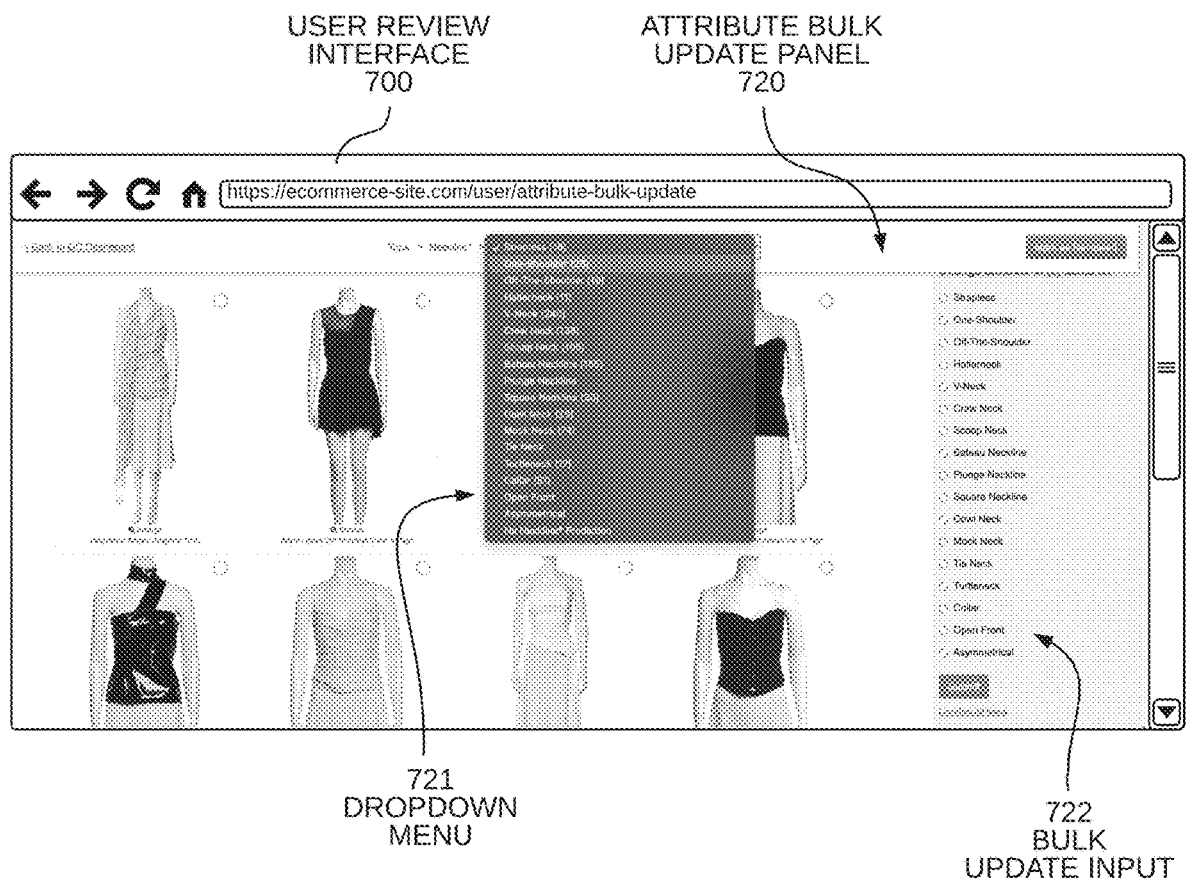
FIG. 27 is a diagram showing an attribute bulk update panel 720.

FIG. 27 is a diagram of an attribute bulk update panel 720. The attribute bulk update panel 720 provides a dropdown menu 721 providing attributes and associated review counts for each taxon. Once selected, items needing review for the selected attributes are displayed along with a bulk update input 722.

Figure 28:
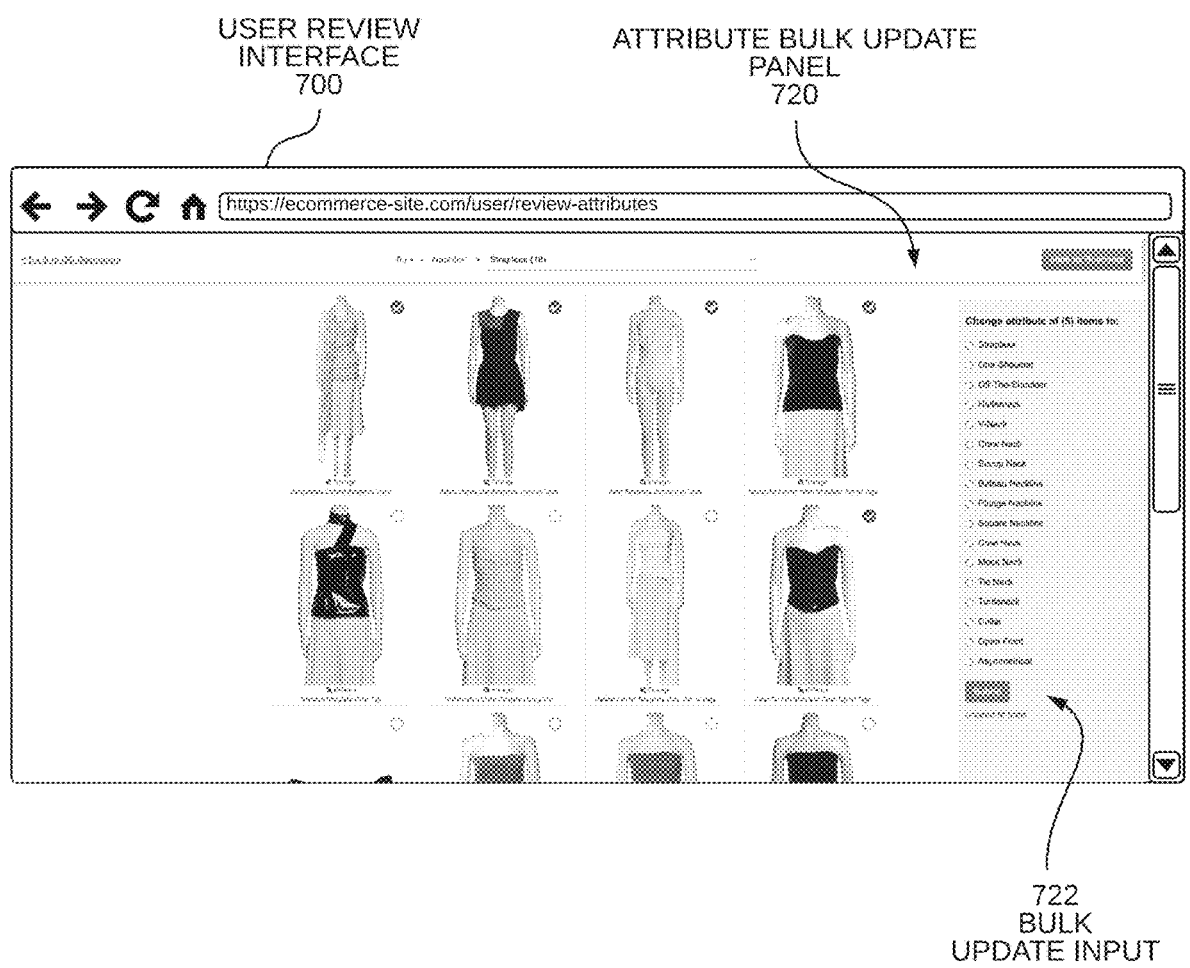
FIG. 28 shows another embodiment of attribute bulk update panel 720.

FIG. 28 is a diagram showing operation of the attribute bulk update panel 720. A user selects various items indicated by green checkboxes in the upper right corner of the selected images. Once selected, the user is able to select the appropriate attribute and click the "SUBMIT" button in the bulk update input 722.

Figure 29:
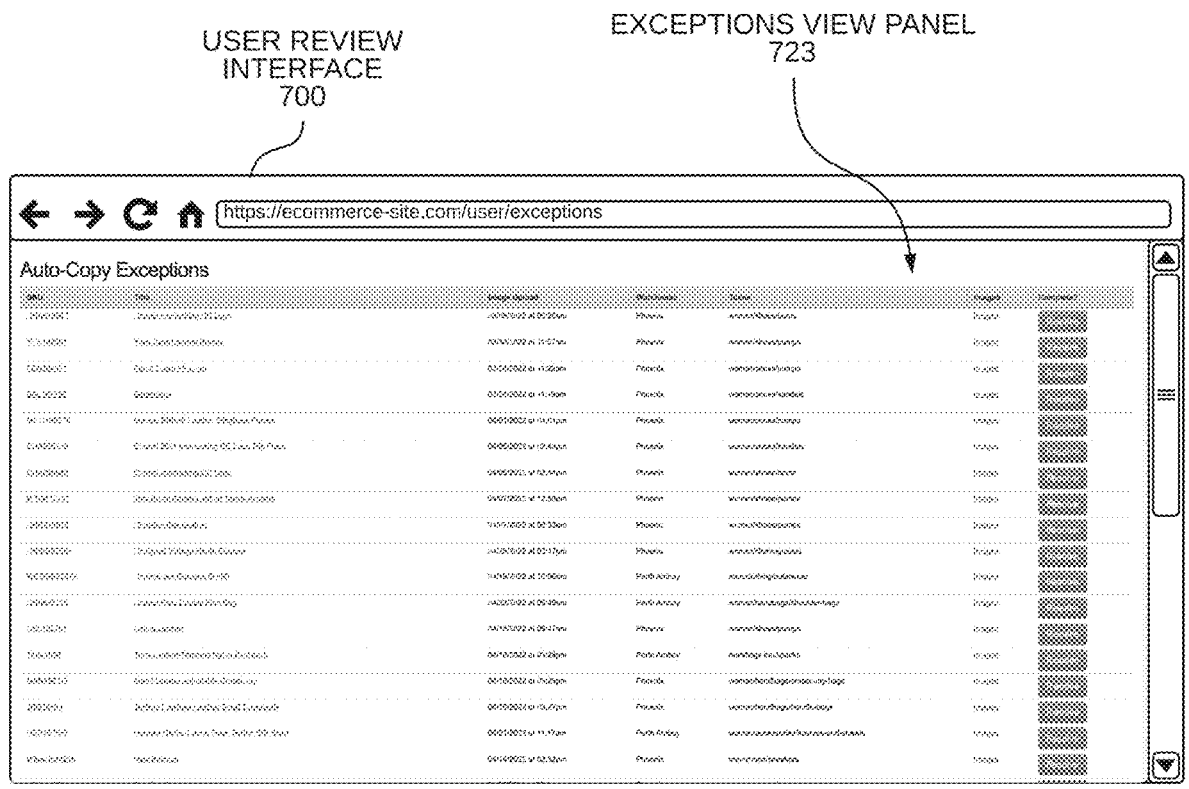
FIG. 29 is a diagram showing an exceptions view panel 723.

FIG. 29 is a diagram showing an exceptions view panel 723. The exceptions view panel 723 presents items needing review that for whatever reason were not processable by the attribute machine learning system. The exceptions view panel 723 provides catch-all functionality to ensure that a provider is able to appropriately handle all input image data.

Figure 30:
FIG. 30 is a diagram showing a table 725 which includes example training data for how the attribute machine learning system 37 is trained.
Figure 30:
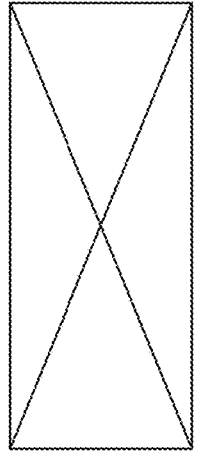

FIG. 30 is a diagram showing a table 725 which includes example training data for how the attribute machine learning system 37 is trained.

Figure 31:
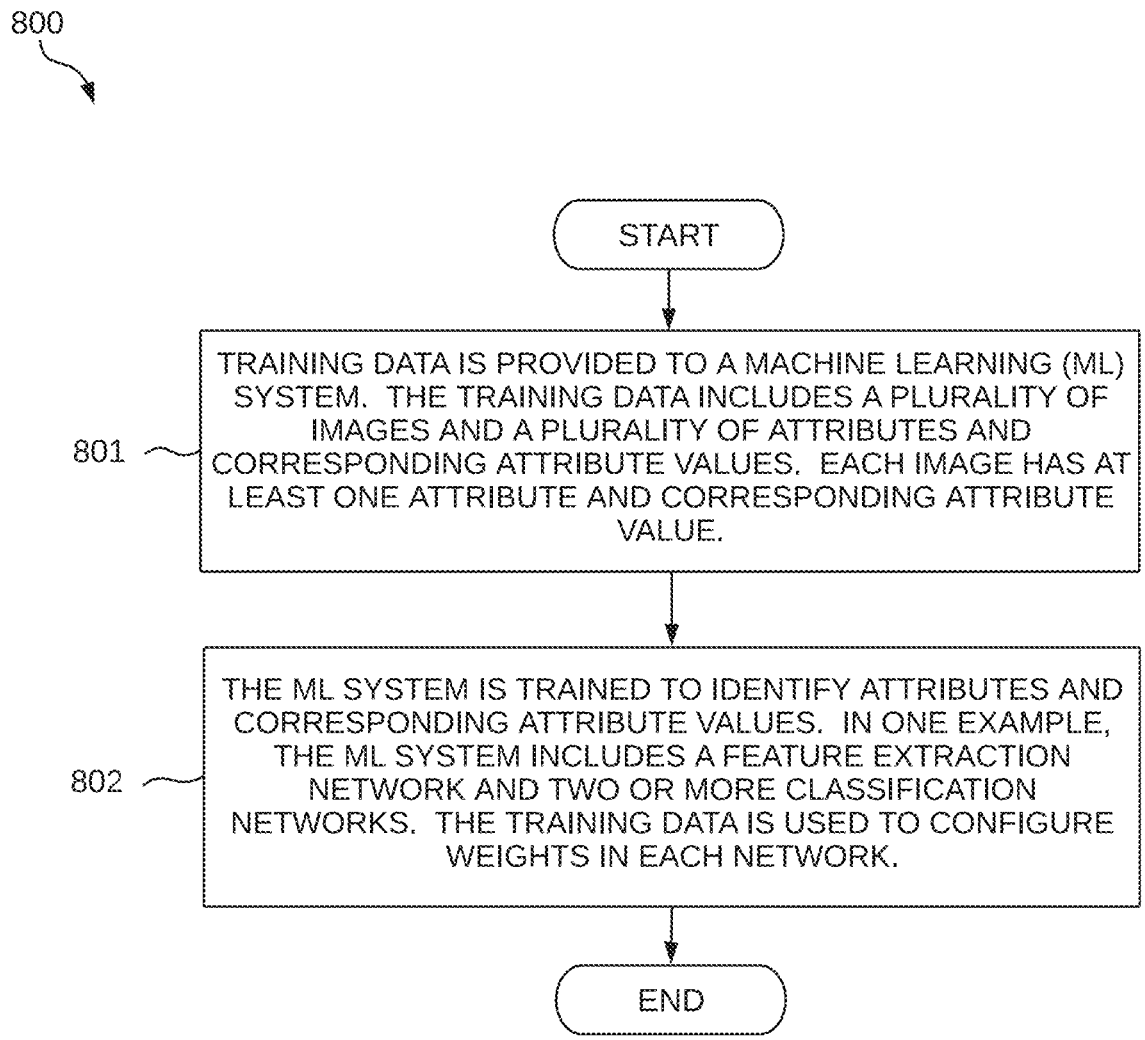
FIG. 31 is a flowchart of a method 800 in accordance with another novel aspect.

FIG. 31 is a flowchart of a method 800 in accordance with another novel aspect. In a first step (step 801), training data is provided to an attribute machine learning system. The training data includes a plurality of images and a plurality of attributes and attribute values. Each image has at least one attribute and a corresponding attribute value.

In a second step (step 802), the attribute machine learning system is trained to identify attributes and corresponding attribute values. In one example, the attribute machine learning system includes a feature extraction network and two or more classification networks. The training data is used to configure weights in each network.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   receiving image data of an item;
   determining an attribute value and a prediction confidence value for the item based on the image data, wherein the attribute value and the prediction confidence value are determined using an attribute machine learning system having one or more multi-headed machine learning models, and wherein each of the one or more multi-headed machine learning models is trained to determine attribute values and corresponding prediction confidence values for a particular type of item;
   comparing the prediction confidence value to a threshold, wherein if the prediction confidence value is outside the threshold, then the attribute value is selected for user review; and
   providing a user review interface during user review, wherein the user review interface includes a common attribute item viewer panel having one or more images of items determined by the attribute machine learning system to have a common attribute value, wherein all items having the common attribute value are viewable within the common attribute item viewer panel without needing to toggle between other panels or between other user interface elements, wherein the user review interface includes an item viewer panel, wherein when an item in the common attribute item viewer panel is selected, the item viewer panel is overlaid above the common attribute item viewer panel, wherein the item viewer panel has an image viewer interface and a selectable attribute interface, wherein the one or more images of the item are viewable via the image viewer interface, wherein a plurality of selectable attribute values is selectable via the selectable attribute interface, wherein the image viewer interface and the selectable attribute interface are adjacent to each other, and wherein the image viewer interface and the selectable attribute interface are presented simultaneously in the item viewer panel without needing to toggle between other panels or between other user interface elements.

2. A method comprising:
   receiving image data of an item;

determining an attribute value and a prediction confidence value for the item based on the image data, wherein the attribute value and the prediction confidence value are determined using an attribute machine learning system having one or more multi-headed machine learning models, and wherein each of the one or more multi-headed machine learning models is trained to determine attribute values and corresponding prediction confidence values for a particular type of item;

comparing the prediction confidence value to a threshold, wherein if the prediction confidence value is outside the threshold, then the attribute value is selected for user review; and providing a user review interface during user review, wherein the user review interface includes a common attribute item viewer panel having one or more images of items determined by the attribute machine learning system to have a common attribute value, wherein all items having the common attribute value are viewable within the common attribute item viewer panel without needing to toggle between other panels or between other user interface elements, wherein the user review interface includes an item viewer panel, wherein when an item is selected, the item viewer panel is overlaid above the common attribute item viewer panel, wherein the item viewer panel has an image viewer interface and a selectable attribute interface, wherein the one or more images of the item are viewable via the image viewer interface, wherein a plurality of selectable attribute values is selectable via the selectable attribute interface, wherein the image viewer interface and the selectable attribute interface are adjacent to each other, wherein the image viewer interface and the selectable attribute interface are presented simultaneously in the item viewer panel without needing to toggle between other panels or between other user interface elements, wherein each of the selectable attribute values is selectable in less than two user actions, and wherein a selected attribute value selected during user review is substituted for the attribute value determined using the attribute machine learning system.

3. The method of claim 2, wherein feedback is provided to the attribute machine learning system based on the selected attribute value selected during user review.

4. A method comprising:

receiving image data of an item;

determining an attribute value and a prediction confidence value for the item based on the image data, wherein the attribute value and the prediction confidence value are determined using an attribute machine learning system having one or more multi-headed machine learning models, and wherein each of the one or more multi-headed machine learning models is trained to determine attribute values and corresponding prediction confidence values for a particular type of item;

comparing the prediction confidence value to a threshold, wherein if the prediction confidence value is outside the threshold, then the attribute value is selected for user review; and providing a user review interface during user review, wherein the user review interface includes a common attribute item viewer panel having one or more images of items determined by the attribute machine learning system to have a common attribute value, wherein all items having the common attribute value are viewable within the common attribute item viewer panel without needing to toggle between other panels or between other user interface elements, wherein the user review interface includes an item viewer panel, wherein when an item is selected, the item viewer panel is overlaid above the common attribute item viewer panel, wherein the item viewer panel has an image viewer interface and a selectable attribute interface, wherein the one or more images of the item are viewable via the image viewer interface, wherein a plurality of selectable attribute values is selectable via the selectable attribute interface, wherein the image viewer interface and the selectable attribute interface are adjacent to each other, wherein the image viewer interface and the selectable attribute interface are presented simultaneously in the item viewer panel without needing to toggle between other panels or between other user interface elements, wherein a selected attribute value is used to generate a description of the item on a Product Detail Page (PDP) in connection with the item.

* * * * *